US012608231B2

(12) United States Patent　　　　(10) Patent No.:　US 12,608,231 B2
Maar　　　　　　　　　　　　　　　　(45) Date of Patent:　*Apr. 21, 2026

(54) SYSTEMS AND METHODS FOR VIDEO/AUDIO PRODUCTION AND ARCHITECTURE TO OPTIMIZE UNUSED CAPACITY

(71) Applicant: NECF, Concord, MA (US)

(72) Inventor: Joseph Henry Maar, Concord, MA (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/597,070

(22) Filed: Mar. 6, 2024

(65) Prior Publication Data

US 2024/0248757 A1　　Jul. 25, 2024

Related U.S. Application Data

(63) Continuation of application No. 17/254,092, filed as application No. PCT/US2019/037478 on Jun. 17, 2019, now Pat. No. 11,960,931.

(60) Provisional application No. 62/686,607, filed on Jun. 18, 2018, provisional application No. 62/686,600, filed on Jun. 18, 2018.

(51) Int. Cl.
　*G06F 9/50*　　　　(2006.01)
　*G06F 9/48*　　　　(2006.01)
　*G06F 16/45*　　　(2019.01)

(52) U.S. Cl.
　CPC .............. *G06F 9/5005* (2013.01); *G06F 9/48* (2013.01); *G06F 9/4806* (2013.01);
　　　　　　　(Continued)

(58) Field of Classification Search
　CPC ........ G06F 9/50; G06F 9/5005; G06F 9/5061; G06F 9/5077; G06F 16/45; G06F 9/48;
　　　　　　　(Continued)

(56) References Cited

U.S. PATENT DOCUMENTS 9,239,727 B1 *　1/2016　Panchapakesan ... G06F 9/44505
9,609,374 B2 *　3/2017　Peterson ................ G06Q 10/00
　　　　　　　　(Continued)

OTHER PUBLICATIONS

Saleh et al, "Monitoring and Autoscaling IaaS Clouds: A Case for Complex Event Processing on Data Streams", 2013 IEEE/ACM 6th International Conference on Utility and Cloud Computing, pp. 387-392 (Year: 2013).*

(Continued)

*Primary Examiner* — Charles M Swift
(74) *Attorney, Agent, or Firm* — SEYFARTH SHAW LLP

(57)　　　　　ABSTRACT

A method for providing one or more resources to a user device via a time-limited production architecture includes receiving, from the user device, a request for the one or more resources associated with a type of project. The method also includes identifying a set of resources, each resource associated with one or more respective remote devices, each resource associated with a respective time frame of availability. The method further includes transmitting, to the user device, a first message indicating a prioritized set of resources and the respective time frame of availability of each resource. The method also includes receiving, from the user device, a second message indicating a subset of resources from the prioritized set of resources. The method further includes establishing the time-limited production architecture between the user device and each device of the one or more respective devices associated with each resource of the subset of resources.

20 Claims, 25 Drawing Sheets

(52) U.S. Cl.
CPC .......... *G06F 9/4843* (2013.01); *G06F 9/4881*
(2013.01); *G06F 9/50* (2013.01); *G06F*
*9/5027* (2013.01); *G06F 9/5044* (2013.01);
*G06F 9/5055* (2013.01); *G06F 9/5061*
(2013.01); *G06F 9/5077* (2013.01); *G06F*
*16/45* (2019.01)

(58) Field of Classification Search
CPC .... G06F 9/4806; G06F 9/4843; G06F 9/4881;
G06F 9/5027; G06F 9/5044; G06F
9/5055; G11B 27/031; H04N 21/2543;
H04N 21/2547; H04N 21/472; H04N
21/47205; H04N 21/854
See application file for complete search history.

(56) References Cited

U.S. PATENT DOCUMENTS

| | | | | |
|---|---|---|---|---|
| 2002/0053078 A1* | 5/2002 | Holtz | ................. | H04N 21/4782 |
| | | | | 348/E5.022 |
| 2004/0078825 A1* | 4/2004 | Murphy | ............... | H04N 23/662 |
| | | | | 725/115 |
| 2008/0059270 A1* | 3/2008 | Baumer | ............. | G06Q 10/1097 |
| | | | | 705/7.34 |
| 2011/0238460 A1* | 9/2011 | Al-Dawsari | ......... | H04M 15/81 |
| | | | | 705/7.31 |
| 2013/0347037 A1* | 12/2013 | Soroushian | ...... | H04N 21/26258 |
| | | | | 725/39 |
| 2016/0283275 A1* | 9/2016 | Li | ......................... | G06F 9/5011 |
| 2017/0364387 A1* | 12/2017 | Ahmed | .................... | G06F 3/067 |
| 2018/0012151 A1* | 1/2018 | Wang | ..................... | G06Q 10/08 |
| 2019/0163540 A1* | 5/2019 | Lee | ....................... | G06F 9/5077 |
| 2019/0312772 A1* | 10/2019 | Zhao | ..................... | G06F 9/5011 |

OTHER PUBLICATIONS

Gutierrez-Garcia et al, "Collaborative Agents for Distributed Load Management in Cloud Data Centers Using Live Migration of Virtual Machines", IEEE Transactions on Services Computing, vol. 8, No. 6, Nov./Dec. 2015, pp. 916-929 (Year: 2015).*

* cited by examiner

600

602

604

600

606  Mon Jun 10   8   00   PM

616

618

620

608  Control

621

610  Truck

612  Crew

614  Transmission

Cost: $28000.00  622

Submit  624

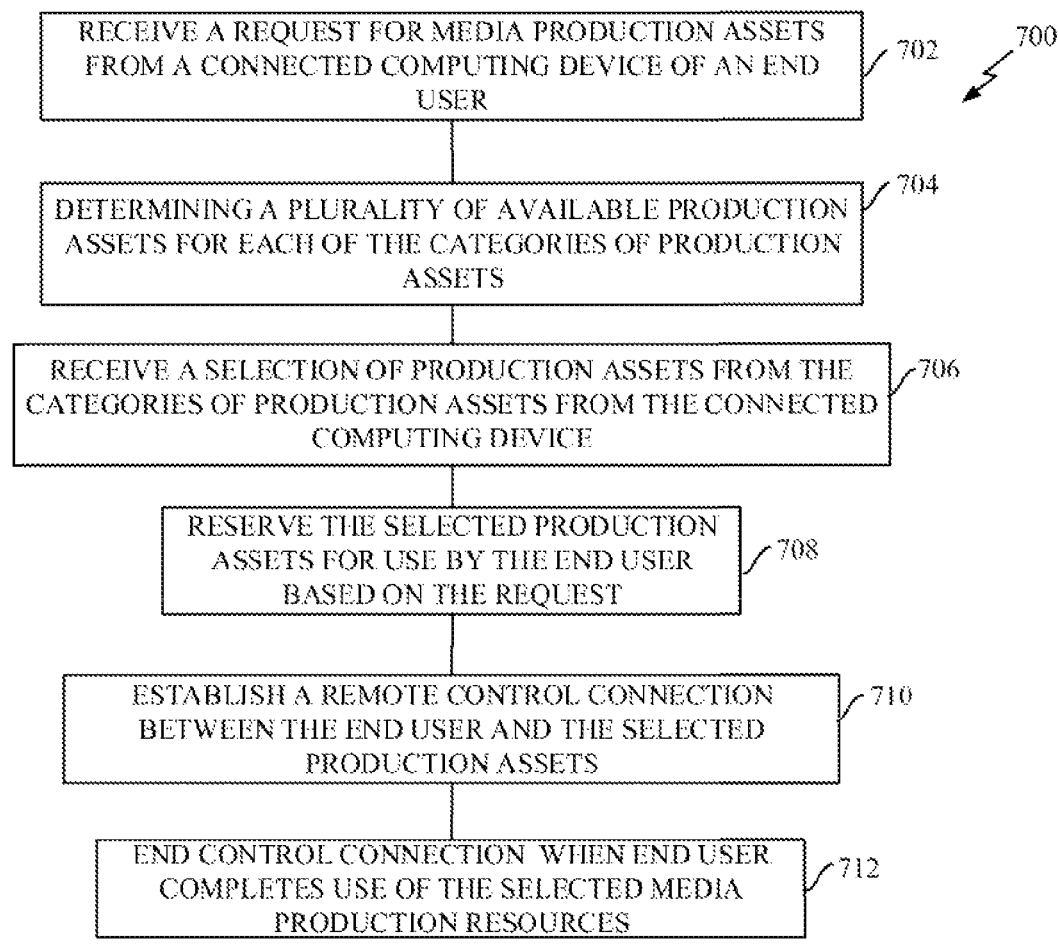

RECEIVE A REQUEST FOR MEDIA PRODUCTION ASSETS FROM A CONNECTED COMPUTING DEVICE OF AN END USER — 702

700

DETERMINING A PLURALITY OF AVAILABLE PRODUCTION ASSETS FOR EACH OF THE CATEGORIES OF PRODUCTION ASSETS — 704

RECEIVE A SELECTION OF PRODUCTION ASSETS FROM THE CATEGORIES OF PRODUCTION ASSETS FROM THE CONNECTED COMPUTING DEVICE — 706

RESERVE THE SELECTED PRODUCTION ASSETS FOR USE BY THE END USER BASED ON THE REQUEST — 708

ESTABLISH A REMOTE CONTROL CONNECTION BETWEEN THE END USER AND THE SELECTED PRODUCTION ASSETS — 710

END CONTROL CONNECTION WHEN END USER COMPLETES USE OF THE SELECTED MEDIA PRODUCTION RESOURCES — 712

FIG. 23

SYSTEMS AND METHODS FOR VIDEO/AUDIO PRODUCTION AND ARCHITECTURE TO OPTIMIZE UNUSED CAPACITY

CROSS-REFERENCE TO RELATED APPLICATIONS

The present application is a continuation of U.S. patent application Ser. No. 17/254,092, filed on Dec. 18, 2020, and titled "SYSTEMS AND METHODS FOR VIDEO/AUDIO PRODUCTION AND ARCHITECTURE TO OPTIMIZE UNUSED CAPACITY," which is a U.S. National Stage of PCT/US2019/037478, filed on Jun. 17, 2019, titled "SYSTEMS AND METHODS FOR VIDEO/AUDIO PRODUCTION AND ARCHITECTURE TO OPTIMIZE UNUSED CAPACITY," which claims the benefit and priority from U.S. Provisional Patent Application Serial Nos. 62/686,600, filed on Jun. 18, 2018, and titled "SYSTEMS AND METHODS FOR VIDEO/AUDIO PRODUCTION AND ARCHITECTURE," and 62/686,607, filed on Jun. 18, 2018, and titled "SYSTEMS AND METHODS FOR VIDEO/AUDIO PRODUCTION," the disclosures of which are expressly incorporated by reference herein in their entireties.

FIELD OF TECHNOLOGY

The present disclosure relates generally to video and audio production, and/or media production, and more particularly to systems and methods including a network architecture for video and audio production (and/or media production). The systems and methods disclosed herein also may be applied to other industries to optimize the sharing of resources, and provide an ordered manner to evaluate consumer and supplier demands and build, manage, and maintain a sharing system.

BACKGROUND

Typically, the production of sports broadcasts, news coverage, entertainment television shows, documentaries, over-the-top media, and digital productions and other videos are traditionally completed at the site of the event being broadcasted, streamed or otherwise distributed. However, the production of the broadcasts of these events require a large number of personnel, such as those in staffing and technical positions, and significant amounts of equipment for these operations to run smoothly. This is also a barrier to entry for digital creators to expand and improve their quality, variety and distribution opportunities. Further, broadcast companies, their vendors, professional video productions and digital creators typically need to get the vast majority of personnel and equipment to the location of the event or content. As a result, these broadcast companies spend large amounts of financial, personnel, and logistical resources in order to produce and broadcast these events at the best quality. Digital creators are typically incapable of procuring, coordinating and affording the resources broadcasters use. This becomes a challenge for things like multi-lingual productions that are increasingly in demand that digital creators cannot easily or affordably resource.

The expansion of Internet of Things (IOT) video is severely limited by the lack of any production architecture to achieve higher growth potential in years to come. This is a global issue, not specific to any single location, country or video creator/broadcaster.

In addition, staffing and equipment is often 1:1 so every show or shift has its own manpower dedicated to a specific role or position. In other words, once the personnel and equipment are located at a specific event, the personnel and equipment are rarely utilized for other broadcasts, video productions or media creation. As a result, over 70% of the time, production equipment at a video facility in the U.S. goes unused, and potentially useful resources go to waste as they sit idly waiting for a specific broadcast or video production to start. Further, manpower dedicated to creating content for a single broadcaster, digital creator or media company often sit idle awaiting other resources or processes to occur before they can do their work. As a result, manpower on broadcasts and video productions often work 33% or less of the time they could be utilized.

In recent years, broadcasting companies have started to experiment with sending camera signals from a sporting event or news program back to their corporate headquarters or a "hub" and producing the event from the broadcast company's control rooms or vendor's facility to save money. However, the expense of the equipment at the central control room or hub facility, plus transmission of the camera signals via fiber, satellite, high-bandwidth Internet or cellular bonding has proven costly or impractical. Further, the skill levels of the staff required for such an operation and the lack of an efficient way to utilize the equipment and manpower at a higher level of capacity have reduced the potential cost savings of using off-site resources. In many cases, the expenses to build and staff for this type of video production exceeds the amortizable savings and ends up costing more. Frequently, staff need to travel to the central control room or hub, thereby making the structure impractical.

Companies and digital creators trying to solve this problem today must invest in high-cost capital and labor with the hope of getting some scale based on a traditional production process. However, the equipment is used only sporadically, often in silos, sitting unused. Companies continue to seek a viable solution to maximize the return on investment for these wasted resources. digital creators and media companies, with typically much lower revenues, are unable to afford the resources and manpower for them to grow affordably in production quality and volume. Additionally, IOT video lacks any systematic coordination to allow for economic opportunities.

SUMMARY

The present disclosure generally provides a specially configured, networked system providing an architecture for end user architects in the video, television, digital creator, IOT video and media industry to improve efficiency and utilization across manpower, technical resources and communications systems, and to optimize video production and broadcasting globally across all levels from media companies to teams, digital creators, prosumer, consumer and IOT. In addition, the present disclosure also provides a specially configured and networked system for architecting greater efficiencies using existing and emerging technologies, including those that contribute to the shared economy.

Further, the present disclosure provides increased opportunities for greater corporate social responsibility to give back to communities and offer new employment options. For example, the present disclosure may provide employment opportunities to the disabled to be utilized within the system to participate in a portion of the shared economy, who would not otherwise be able to provide such participation. The present disclosure may allow the disabled to provide skills and/or equipment remotely, including from their home or a facility for the disabled, and share in production of a given task, or use adaptations and devices that would be atypical and often unattainable in the field.

The networked system according to the present disclosure may connect thousands of broadcasters in the United States and hundreds of thousands of additional broadcasters across the world. Further, the specially configured, networked system allows people anywhere on the globe to participate in the creation of, transmission of, or interaction with the production of audio/video and media content for anyone, anywhere, in real time. This system allows video producers and media companies to increase efficiency and utilization of their equipment, for their corporate parent, third parties, clients, and even competitors. The networked system also networks new and legacy equipment with the newest transmission methods. Additionally, the system also allows for manpower to work on multiple items in a shift, regardless of where or who is creating the media/video and agnostic to where the manpower is located. Further, the system networks human capital and provides options for creators to work for any combination of media companies, video producers and vendors, including for competitors who otherwise could not architect and coordinate using the same person on the same shift or at the same or in contiguous time.

In addition, all consumers, vendors and distributors, would gain access to a specially configured network interface. The present disclosure provides a new protocol for efficient production and transmission of video content. It allows for increased production volume as the process, architecture and computer system is available for all consumers with a communication device from drone video operators to educational institutions, businesses to large broadcasting operators and media companies to digital creators down to the consumer and IOT. System parameters may include both live and prerecorded audio/video content, single and multi-camera, audio only and any media creation/video production or procurement platform.

A media production system according to the present disclosure includes a connected computing device adapted to receive input from and output information to an end user, a network in communication with a plurality of media production resources for use in media production and broadcasting, the plurality of media production resources comprising resources from the end user and third party vendors, and a virtual control center or matrix connecting the request computing device and the plurality of media production resources that includes an architect engine. The architect engine is adapted to receive a request for use of media production resources from the connected computing device; determine a plurality of available production assets from the plurality of media production resources; and receive a selection of production resources from the connected computing device.

The request for use of media production resources includes a plurality of categories of the media production resources and the virtual control center or matrix is further adapted to categorize the plurality of available production resources into the plurality of categories. The categories of media production resources further include a plurality of sublevels of the categories of media production resources and the virtual control center or matrix is further adapted to categorize the plurality of available production resources into the plurality of sublevels in each of the plurality of categories. The selection of production assets includes a selection of one sublevel from each of the categories of the media production resources including production tools, manpower and communications. The architect engine is further adapted to calculate a cost of selected media production assets based on the selection of sublevels from each of the categories of the media production resources. In addition, the architect engine is further adapted to adjust the cost of selected media production assets based on a change in the selection of sublevels from each of the categories of the media production resources. The architect engine is further adapted to reverse the process and calculate resource options, reliabilities and risks when a price or price range is input.

The request for use of media production resources further comprises a request location, a request date, and a request time and the architect engine is further adapted to reserve the selected media production resources at the request location on the request date at the request time. The architect engine is further adapted to establish a control connection between the connected computing device and the selected media production resources at a request location on the request date at the request time, the control connection being established using remote device control technology. The architect engine is further adapted to end the control connection once the end user completes use of the selected media production resources. The architect engine is also adapted to request and receive input about user media production resources to be shared through the system. The architect engine is additionally adapted to output options to change the time, location and quality levels that in turn will change the cost and risk factors.

A method for a video production system according to the present disclosure includes receiving a request for media production assets from different categories from a connected computing device of an end user, determining a plurality of available production assets from a network in communication with the plurality of media production resources for each of the categories of production assets, and receiving a selection of production assets from the categories of production assets from the connected computing device. The method may further comprise categorizing the plurality of available production resources into a plurality of categories of resources, wherein the request for use of media production resources further comprises the plurality of categories of the media production resources. In addition, the method may comprise categorizing the plurality of available production resources into a plurality of sublevels in each of the plurality of categories, wherein the categories of media production resources further comprise the plurality of sublevels of the categories of media production resources. The methods and systems of the present disclosure allow an end user to prioritize categories, such as time, location, manpower type/quality, price, risk, content type/level, and system items required or not needed, and the like.

The selection of production assets may include a selection of one sublevel from each of the categories of the media production resources. The method may further include calculating a cost of selected media production assets based on the selection of sublevels from each of the categories of the media production resources and adjusting the cost of selected media production assets based on a change in the selection of sublevels from each of the categories of the media production resources. The method may further include requesting and receiving input about user media production resources to be shared through the system.

BRIEF DESCRIPTION OF THE DRAWINGS

Embodiments of devices, systems, and methods are illustrated in the figures of the accompanying drawings, which are meant to be exemplary and not limiting, in which references are intended to refer to like or corresponding parts, and in which:

FIG. 23 illustrates a flow diagram for an audio/video production system that improves efficiency increases productivity and optimizes global media/video productions, media creation and broadcasting according to the present disclosure.

DETAILED DESCRIPTION

The detailed description of the present disclosure set forth herein makes reference to the accompanying drawings, which show various embodiments by way of illustration. While these embodiments are described in sufficient detail to enable those skilled in the art to practice the disclosure, it should be understood that other embodiments may be realized, and that logical and physical changes may be made without departing from the spirit and scope of the disclosure. Thus, the detailed description herein is presented for purposes of illustration only and not limitation. For example, the functional blocks illustrated in the system may be alternatively configured and/or the steps recited in any of the method or process descriptions may be executed in an order other than as presented and are not limited to the order presented. Moreover, references to a singular embodiment may include plural embodiments, and references to more than one component may include a singular embodiment.

The present disclosure provides a system including components for extensive and specialized processes to improve efficiency, increase productivity and optimize global video productions, media creation and broadcasting across all levels from professional to prosumer and consumer. In addition, the present disclosure provides a specially configured, networked system with an architecture for end user architects in the video, television, professional production, digital creator and media industry to efficiently utilize media production and broadcasting resources including manpower, production resources and communications resources.

Figure 1:
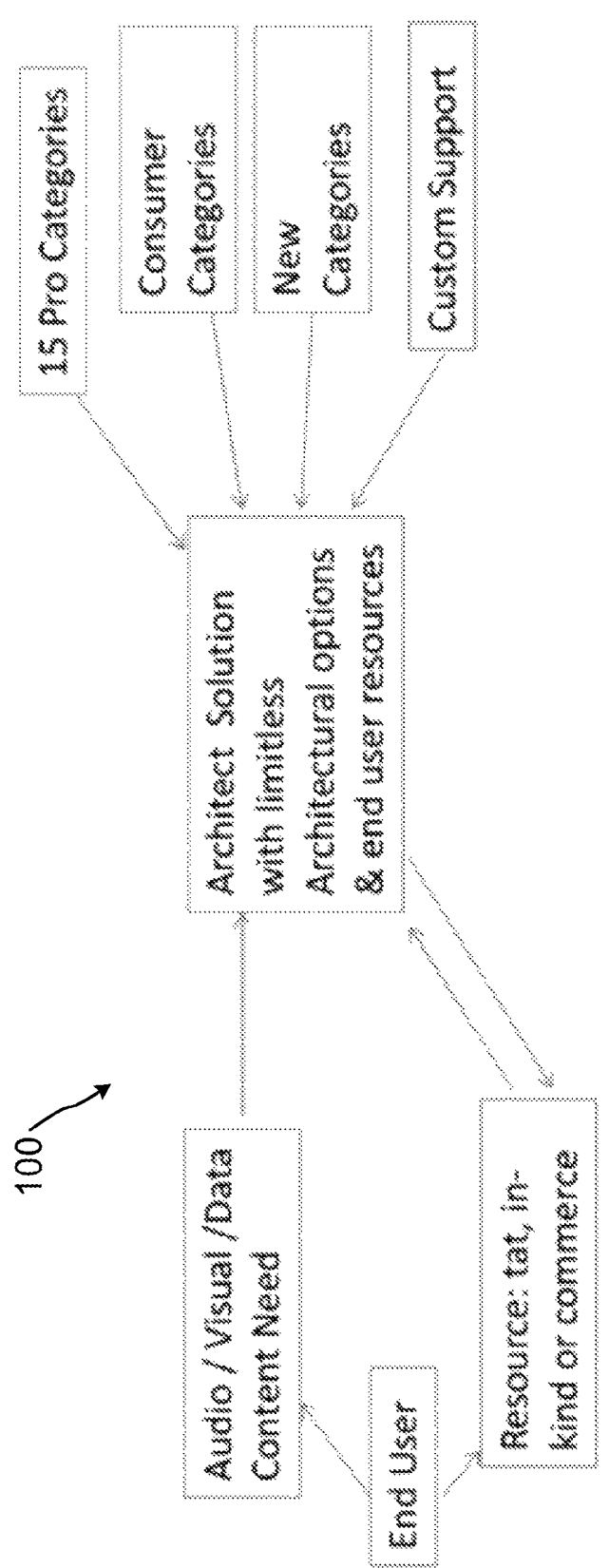
FIG. 1 illustrates an exemplary overview diagram of a system for audio/video production system that improves efficiency and optimizes global video productions, media creation and broadcasting according to the present disclosure.

Referring to FIG. 1, an overview diagram of a system 100 for audio/video production that improves efficiency, increases productivity and optimizes global video productions, media creation and broadcasting is described. The system 100 according to the disclosure allows an end user with a data or media content need and resources to address the need for data or media content in a traditional or sharing economy via a matrix model.

The matrix model may be a specified matrix model used to determine the different parts associated with a production or project and may optimally include 15 production verticals at a range of quality, reliability and performance levels, according to one aspect. For example, a first vertical of the matrix model may be a category used to determine what the project is. An exemplary second vertical of the matrix model may be a location used to determine where the project is to take place. An exemplary third vertical of the matrix model may be a human capital aspect of the project to determine who is used for the project. For example, the human capital may be an "above the line" figure, who is a person that is instantly recognizable in the person's field of work, or a "below the line" figure, who is a person that is not instantly recognizable in the person's field of work but instead provides support services. Further, a transportation/communication aspect, a virtual hub matrix/format, an automation aspect, an administration aspect, a compliance aspect, a cognitive aspect, an artificial intelligence aspect, and an input/output aspect may be the fourth vertical through the eleventh vertical of the matrix model and be used to determine how the project is to be completed. In addition, a schedule date/time may be the twelfth vertical of the matrix model to determine when the project is to be executed and/or completed. A ratings/risk aspect, which may be the thirteenth vertical of the matrix model, may be used to determine why the project is needed. Furthermore, a cost/commerce aspect may be the fourteenth vertical of the matrix model and be used in the why and how of the project. Finally, the fifteenth vertical of the matrix model may be an architect aspect that affects and matrixes the what, when, where, who, how, and why/risk-level of the matrixed project. In addition, the architect aspect may be used to reflect the priorities of the end user to reflect the needs and wants of the end user within the parts of the project. Further, using the AI engine, the matrix model may be used to provide differing priority and resource options that give the end user with alternatives they could not have known.

For example, the need for data or media content may be a need for the production and broadcast of live sporting games or other events. Resources may include cash or other financial resources to help fund a production or broadcast, equipment, such as cameras, graphics, replays, switching gear, sound equipment, production centers, and the like, and staffing such as camera crews, producers, on-air talent/celebrities and the like that can be used by the end user or other users to address data, video production and media needs.

The end user may use a connected computing device to access the system 100 with an architect engine to allow the end user to design and specify each aspect of the need for data or media content for a customized production and broadcast. The system 100 may be adapted to interconnect the request computing device and the plurality of media production resources. The connected computing device may be any computing device capable of operating software that connects the computing device to video production gear located remotely from the connected computing device. The software allows the end user to remotely view, machine control, and operate the video production gear, plan for a future matrix of resources in a one-off or series, and see others who are interoperating with the other end users or production creators. Some exemplary video production gear includes switchers, audio equipment, cameras, record/replay units, graphics units, drones, special effects, dual-language units, and the like. The connection between the connected computing device and the video production gear and/or the manpower may be a remote device control technology or method to coordinate and provide the resources on-demand. Further, the video production gear may also be connected to the system 100 using one or more forms of telecommunications based on the need of the end user.

Figure 2:
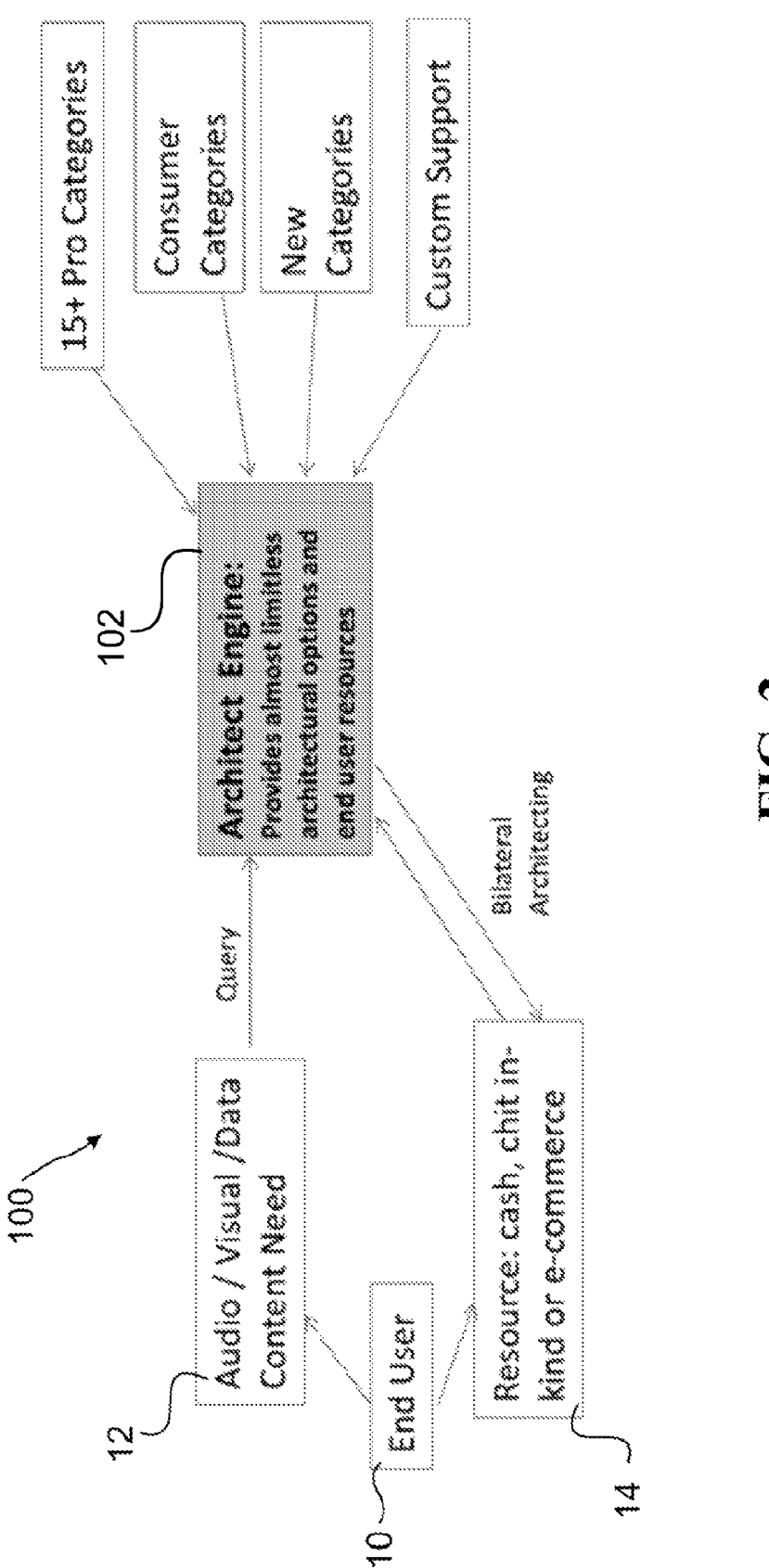
FIG. 2 illustrates an overview diagram of a user and an architect engine for a system for audio/video production system that improves efficiency, increases productivity and optimizes global video productions, media creation and broadcasting according to the present disclosure.

The system 100 includes an architect engine 102, depicted in FIG. 2, that further connects resources/assets, from different vendors including the end user 10, that can be used in the production and/or broadcasting of the video, audio, data or media content to be coordinated and more efficiently utilized. The architect engine 102 is able to unlock hidden value by offering the end user resources options that were previously unattainable. These resources/assets can be requested and/or accessed by any connected user and connected vendor at any desired time without the need to move resources to a physical location. As a result, the end user 10 receives the customized production and broadcast at a reduced cost and/or higher quality, compared to each user and vendor using their own resources to address their needs, and the end user's and vendors' resources are better utilized to work towards reaching the capacity of the resources and/or increasing content volume.

The system 100 may be implemented in computing environments or networks. Various embodiments described herein involve sensitive and personal information regarding assets/resources, vendors, and users. Thus, it should be appreciated that the computing environment is not a general-purpose computing environment. Rather, the computing environment implements specially configured parameters, and may be part of a network of secure computing environments with an end-user interface that is available to any producer, media company, vendor or resource provider. For example, the system may be specially configured to operate on various computing platforms such as personal computers, and mobile devices and may be adapted for use with each computing platform. However, end users and providers will be able to use general interfaces including iOS, Windows, Linux, Android and other devices.

Figure 3:
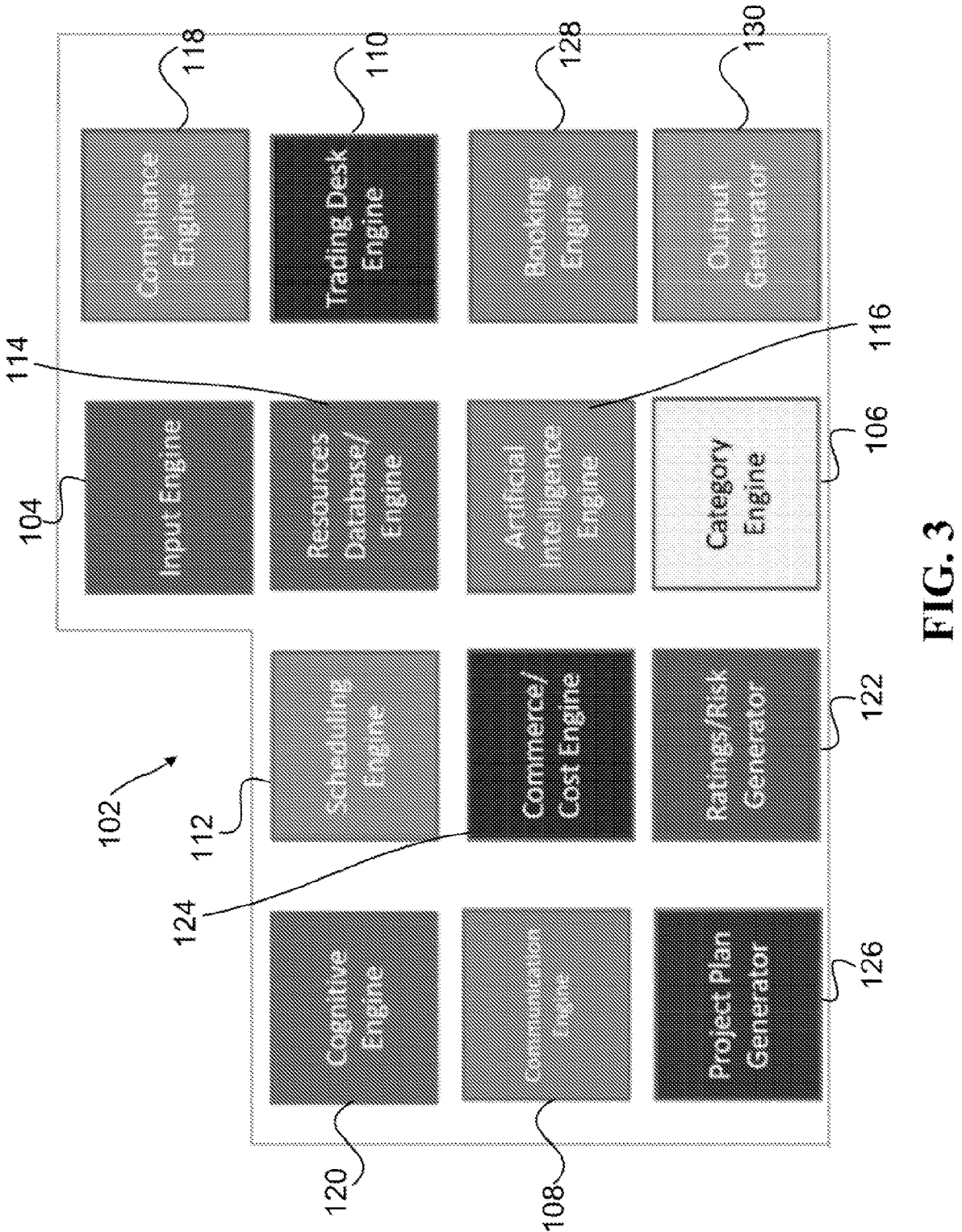
FIG. 3 illustrates block diagram for an architect engine for the audio/video production system that improves efficiency, increases productivity and optimizes global video productions, media creation and broadcasting according to the present disclosure.

The architect engine 102 may allow the end user 10 to select assets of a number of different categories and levels related to resources/assets for use in data and media production and broadcasting such as, but not limited to, site equipment assets, site crew assets, truck/hub equipment assets, virtual assets, software as a service (SaaS) and infrastructure as a service (IaaS) assets, truck/hub crew assets, telecommunications assets, above the line production assets, talent assets, administration assets, programming assets, and travel/new co-location assets. As illustrated in FIGS. 2 and 3, the architect engine 102 may include an input engine 104 adapted to receive information from the end user and other vendors regarding their assets such as technical requirements, technical specifications, and rates for the assets. The architect engine may further include a category engine 106 adapted to organize levels of each category of resources/assets, and a communication engine 108 adapted to interface between the end user and vendors to compare different assets at various quality levels and with feedback/ratings from other users and the platform provider. Further, the architect engine 102 may also have a trading desk engine 110 adapted to allow for gathering information regarding resources offered through the system 100 based on information from the input engine 104 and the category engine 106 to unlock values of the resources, a scheduling engine 112 adapted to schedule the selected assets, and a resource database/engine 114 adapted to gather and store information about each of the categories of assets, users, and vendors.

An artificial intelligence engine 116 may be included in the architect engine 102 to determine and analyze information regarding the assets. The architect engine may also have a compliance engine 118 adapted to ensure the user's needs and government rules and regulations are met by the assets, a cognitive engine 120 adapted to suggest asset levels to the end user that meet the end user's needs, and a ratings/risk generator 122 adapted to receive and store ratings associated with each asset from the user after use of the asset and the user from the vendor of the asset. Further, the architect engine 102 may also have a commerce/cost engine 124 adapted to determine a cost of the end user's selected assets, a project plan generator 126 adapted to coordinate the selected assets into a plan for the production and/or broadcast of the media, and a booking engine 128 adapted to reserve the selected assets, and an output generator 130 adapted output information related to the assets to the end user.

Figure 4:
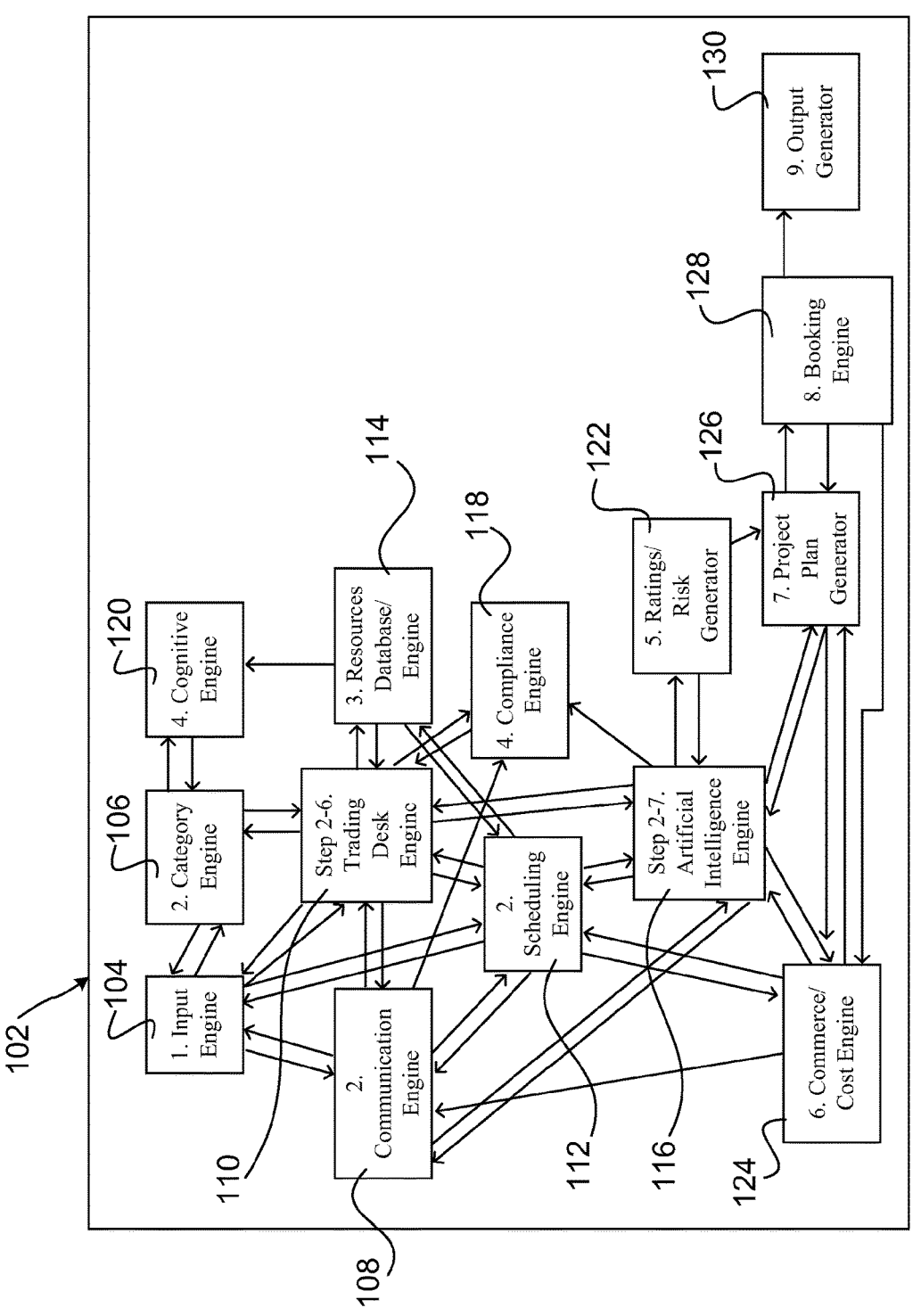
FIG. 4 illustrates a detailed system block diagram for the architect engine of the audio/video and media production system that improves efficiency and optimizes global video productions and broadcasting according to the present disclosure.
Figure 5:
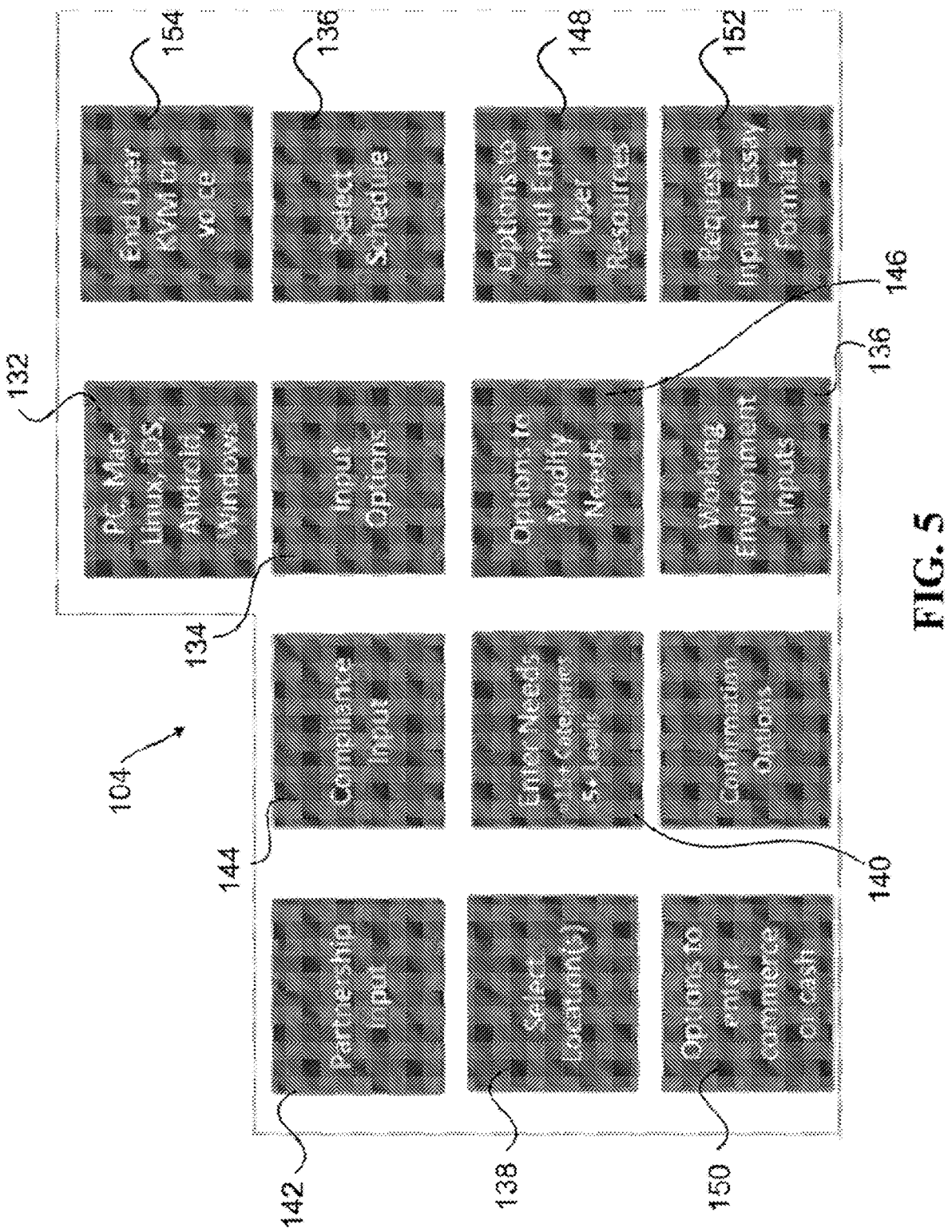
FIG. 5 illustrates a detailed block diagram for an input engine for the audio/video production system that improves efficiency, increases productivity and optimizes global video productions, media creation and broadcasting according to the present disclosure.

The input engine 104 may be communicably coupled to the category engine 106, the communication engine 108, the trading desk engine 110, and the scheduling engine 112, as shown in FIG. 4. As shown in FIG. 5, the input engine 104 may be adapted to connect to a connected computing device. As described above, the connected computing device may be any computing device capable of operating software that connects the computing device to video production gear located remotely (including but not limited to in a cloud) from the connected computing device. For example, the connected computing device may be any device with an operating system such as a PC, Mac™, Linux™, iOS™, Android™, Windows™, and the like.

As described above, the input engine 104 is adapted to receive information from the end user and other vendors regarding their assets such as technical requirements, technical specifications, and rates for the assets using a connected computing device 132. The connected computing device may be any one of a number of different computing devices, such as, personal computer, mobile communication device, video broadcasting scheduling software/platforms and the like. The input engine 104 is adapted to receive input options 134 from the end user regarding the end user's needs 136 related to a media/data production and broadcast using a connected computing device 132. Additionally, the input engine 104 may be adapted to prompt the end user to input a specific schedule 136, such as date and time, and location 138 where other vendors' assets/resources are needed using the connected computing devices. Further, the input engine 104 may also be adapted to receive information regarding the needs for the assets and resources such as categories and levels 140 of assets needed. The input engine 104 may also be adapted to receive a partnership input 142, which may be information regarding pre-existing relationships between the end user and another entity or other entities such that the pre-existing relationship allows access to resources or assets from those other entities. A compliance input 144 may also be requested by the input engine 104 to allow the end user to input information regarding certifications related to the assets and resources to verify these assets and resources. The input engine 104 may also be adapted to allow the end user to modify the needs 146 regarding the assets/resources that were previously entered.

The end user may also be prompted to input information regarding any available assets/resource 148 the end user may have that can be offered to other vendors. The input engine 104 may also be adapted to receive input from vendors regarding resources the vendor is willing to outsource or cash the user is willing to use for resources 150. The input engine may prompt the vendor to input details about the asset such as available date and times, technical details, and rates for the asset. The input engine 104 may request the inputs from the user in a written description 152 or voice input 154. Once the input engine 104 receives the user input, the input engine communicates and exchanges the information with the category engine 106, communication engine 108, scheduling engine 112 and trading desk engine 110.

Figure 6:
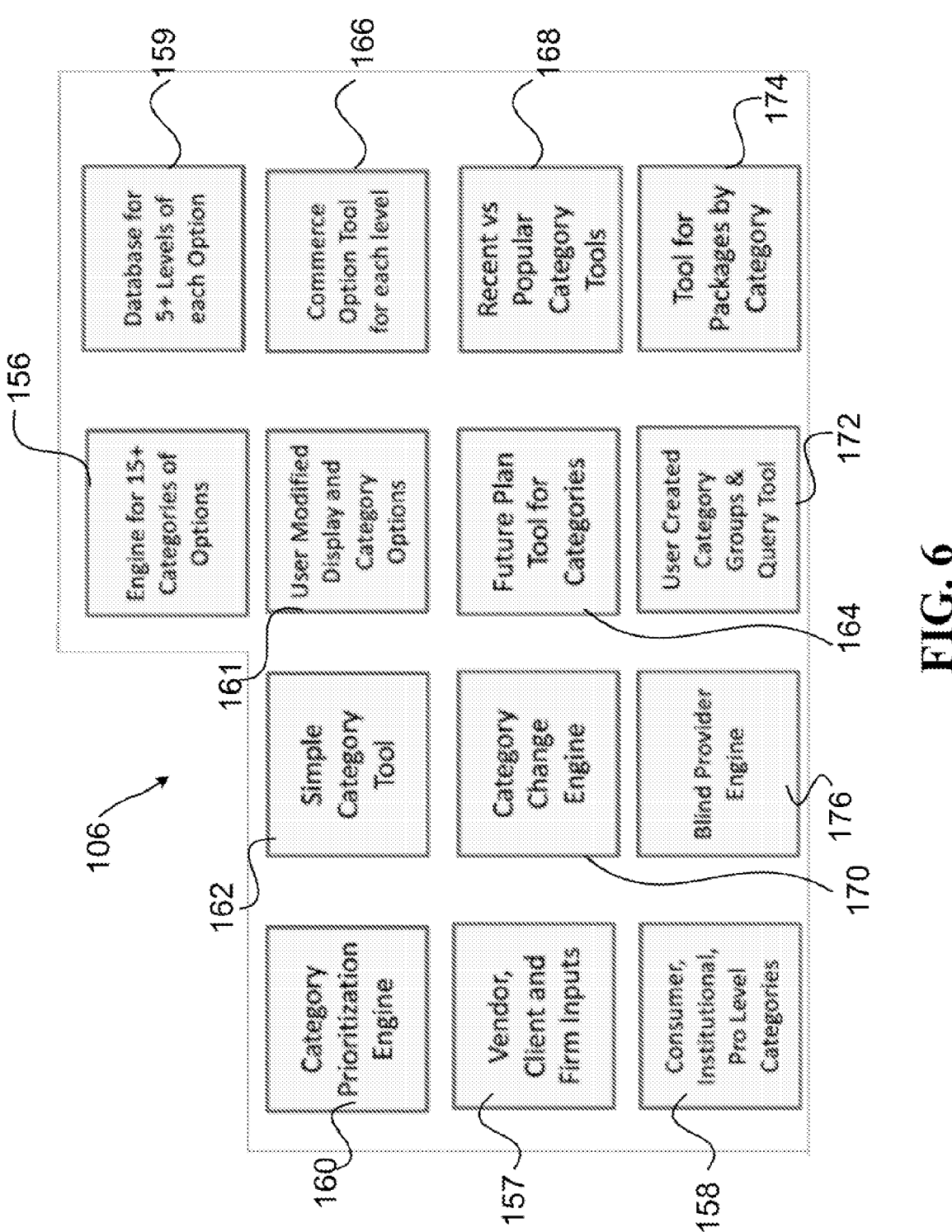
FIG. 6 illustrates a detailed block diagram for a category engine for the audio/video production system that improves efficiency, increases productivity and optimizes global video productions, media creation and broadcasting according to the present disclosure.

The category engine 106 may be the engine for the available categories and levels 156 related to different available assets/resources from the inputs of the end user, vendors and the like. The category engine 106 may be communicably coupled to the input engine 104, the trading desk engine 110, and the cognitive engine 120. In particular, the category engine 106 may receive the inputs from vendors, users, and firms 157 regarding any categories and levels of available assets/resource the end user or other vendors may have such as consumer, institutional, and pro level categories 158. The category engine 106 may have, as shown in FIG. 6, a database 159 adapted to store the categories of available assets and the different levels of the categories of available assets and a category prioritization engine 160 adapted to present the categories of assets that reflect the priority of the end user. The category engine 106 may be adapted to allow a user to modify the display and category options 161, as desired. A simple category tool 162 may be adapted to allow the category engine 106 to provide categories and information about assets and resources based on presently available information. In addition, a future plan tool for categories 164 may be adapted to allow the system 100 to be adaptable to future resources that may be accessible using the system, plan for future resources, and use currently available resources to plan for a future event/events be it a singular item or a series/season of events. Further, a commerce option tool 166 may be used to allow the end user to select a desired level for each category of assets/resources needed by the end user and recent vs. popular category tools 168 are adapted to determine recently used and popular categories of assets used by other users to suggest these assets to the user. A category change engine 170 may be adapted to update categories and levels of assets based on the end user's selection of levels of assets. Further, the category change engine 170 may select predetermined options for assets that users may not desire customization for these assets.

Additionally, the category engine 106 may also have a user created category group and query tool 172 adapted to allow users and vendors to create a category of asset that is not available in the categories of assets and search through the created categories for a matching result that addresses a need for the user. The category engine may also have a tool for packages by category 174 that is adapted to determine packages of categories of assets that may be available to be utilized by the end user. A blind provider engine 176 may be adapted to allow the category engine 106 to blindly store assets offered using the system 100. More particularly, the blind provider engine 176 may be adapted to strip an identity of a provider of an asset associated with the asset and store and provide the asset without the identity of the provider.

Figure 7:
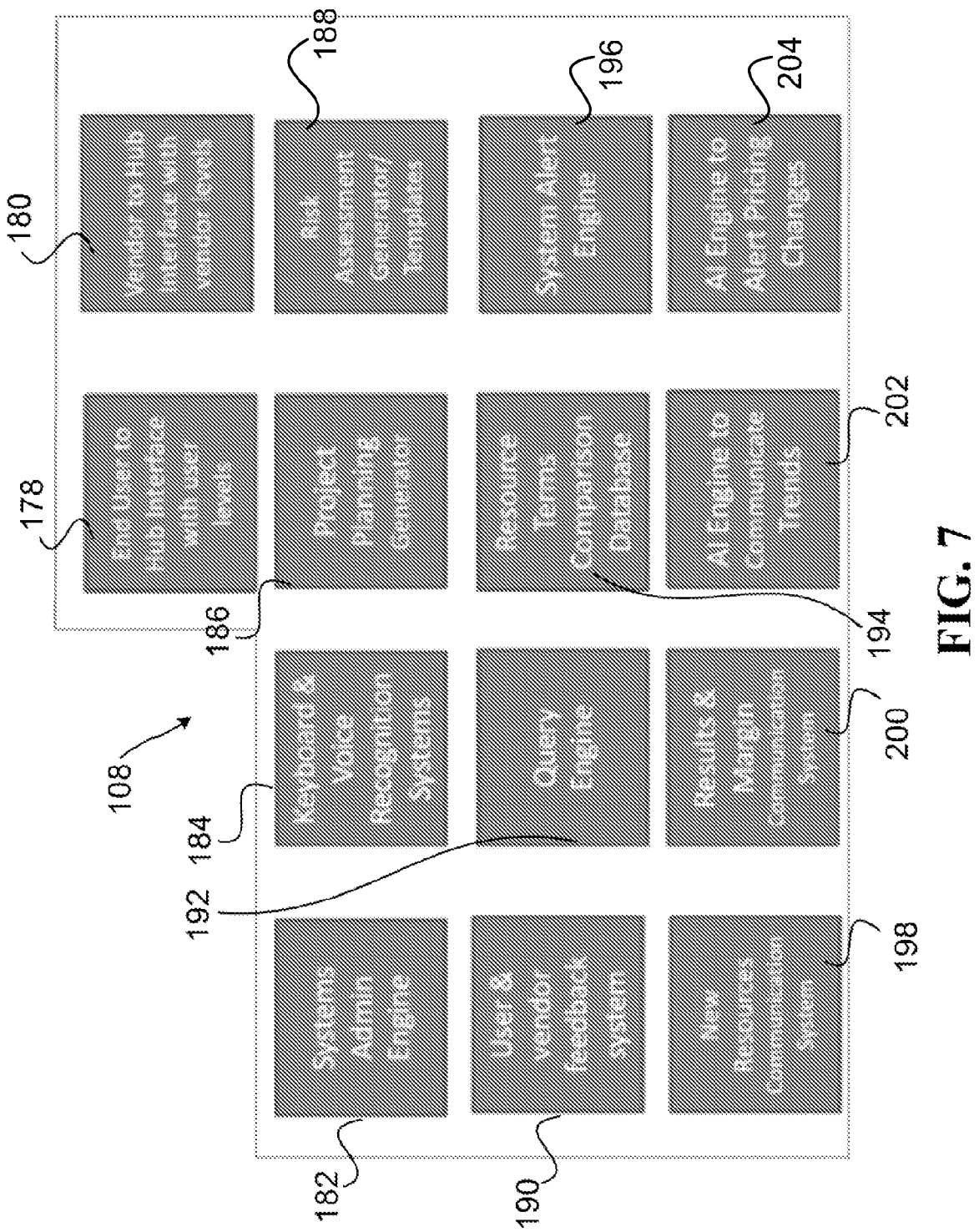
FIG. 7 illustrates a detailed block diagram for a communication engine for the audio/video production system that improves efficiency, increases productivity and optimizes global video productions, media creation and broadcasting according to the present disclosure.

The communication engine 108 may be communicably coupled to the input engine 104, the trading desk engine 110, the scheduling engine 112, the artificial intelligence engine 116, and the commerce/cost engine 124. The communication engine 108 may be adapted to communicate information regarding the system 100 and assets/resources available through the system 100 and act as an interface 178 between the system 100 and the end user and an interface 180 between the system 100 and each vendor. As shown in FIG. 7, the communication engine 108 may have a systems administration engine 182 adapted manage the operation of the system 100. The communications engine 108 may also include keyboard and voice recognition systems 184 to allow for communications between users and vendors through the system 100.

Additionally, the communication engine 108 may include project planning generator 186 adapted to generate a project plan between the user and selected vendors, a risk assessment generator/templates 188 is adapted to determine a level of risk associated with each asset. In particular, the risk assessment generator 188 allows the end user to determine whether the end user is likely to get a level of performance (including but not limited to abilities, prior ratings and/or quality metrics) from the asset that meets the desired level of performance. Additionally, the risk assessment generator 188 may provide different risk assessment based on different desired locations for assets. For example, a specific level of risk while in the United States may be equivalent to a different level of risk in another country. Further, the risk assessment templates 188 may also provide standard questions about the experience with the asset, such as does the asset provide a specific service. A user and vendor feedback system 190 allows users and vendors to review assets from a vendor and users that have used the assets after a collaboration on a media production and broadcast. This allows users and vendors to determine whether a partnership would be a good solution to help address the user's needs by assessing other users' and vendors' experiences.

Further, the communications engine 108 may have a query engine 192 adapted to allow questions regarding assets and production and broadcast needs to be communicated between parties and a resource terms comparison database 194 allows a user to compare the terms associated with each resource the user is considering booking for use, Further, a system alert engine 196 adapted to send alerts to connected users and vendors about the system and connected assets through the connected device. The users and vendors may be able to sign up for specific targeted alerts for assets at a specified time. The alerts may inform the end user of completed orders, orders that require further action, potential opportunities for increased asset quality for minimal additional cost, and potential issues regarding the selected assets for an order. In addition, the user may be able to sign up for alerts regarding new resources that have been added to the system 100 through a new resources communication system 198 or alerts about results and margins after a media production and broadcast need has been addressed using a result & margin communication system 200. Additionally, the communication engine 108 may have an artificial intelligence engine 202 adapted to determine and communicate trends associated with specified assets and an artificial intelligence engine 204 adapted to alert users to pricing changes for available assets that may interest the user.

Figure 8:
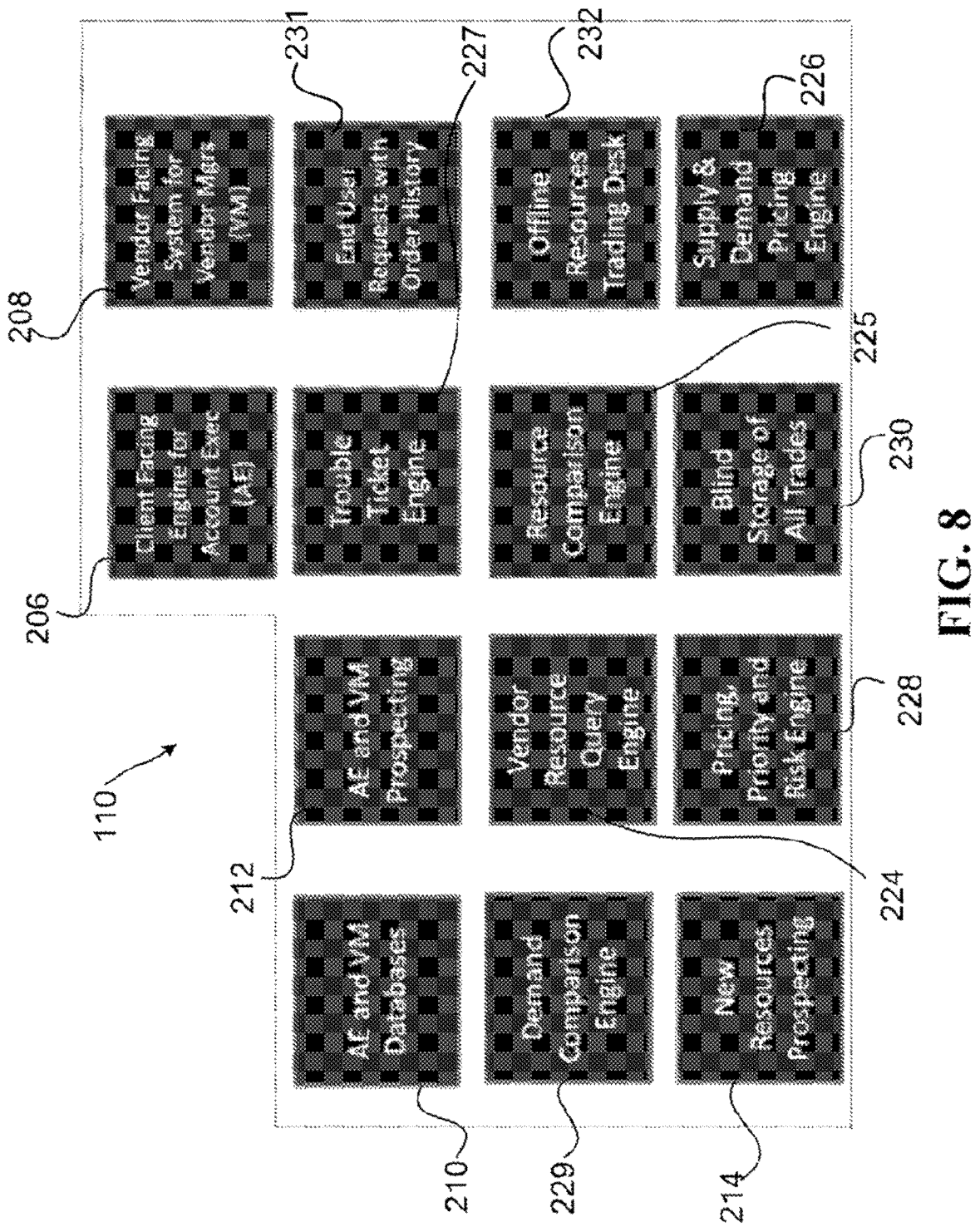
FIG. 8 illustrates a detailed block diagram for a trading desk engine for the audio/video production system that improves efficiency, increases productivity and optimizes global video productions, media creation and broadcasting according to the present disclosure.

The trading desk engine 110 may be communicably coupled to the input engine 104, the category engine 106, the communication engine 108, the scheduling engine 112, the resource database/engine 114, the artificial intelligence engine 116, and/or the compliance engine 118. The trading desk engine 110 includes a user facing engine 206 adapted to coordinate with the user and a vendor system 208 adapted to coordinate with the connected vendors. The trading desk engine 110 is adapted to gather information regarding the availability and use of resources through the system 100. As shown in FIG. 8, the trading desk engine 110 includes a database 210 that stores information regarding account executives (AE), or relationship managers (RM), related to connected users of the system and vendor managers (VM) related to connected vendors with resources available through the system 100. Further, the trading desk engine 110 may be adapted to seek out additional account executives that may be interested in utilizing resources through the system 100 or vendor managers that may have new resources that can be offered for use through the system 100 using AE and VM prospecting 212 and new resource prospecting 214. In particular, prospecting of AE, VM and new resources is performed using trend information regarding assets. In other words, the AE may gather and analyze transaction information and information about different world business trends and determine flows and trends in the demand based on that information. Based on the analysis of transaction and world business trends, the AE may be able to offer a solution for the need. Further, the system may also determine there is insufficient supply for a demand of a specific asset, and prospect for more that asset by contacting vendors and building relationships with the vendors for additional assets.

Figure 8A:
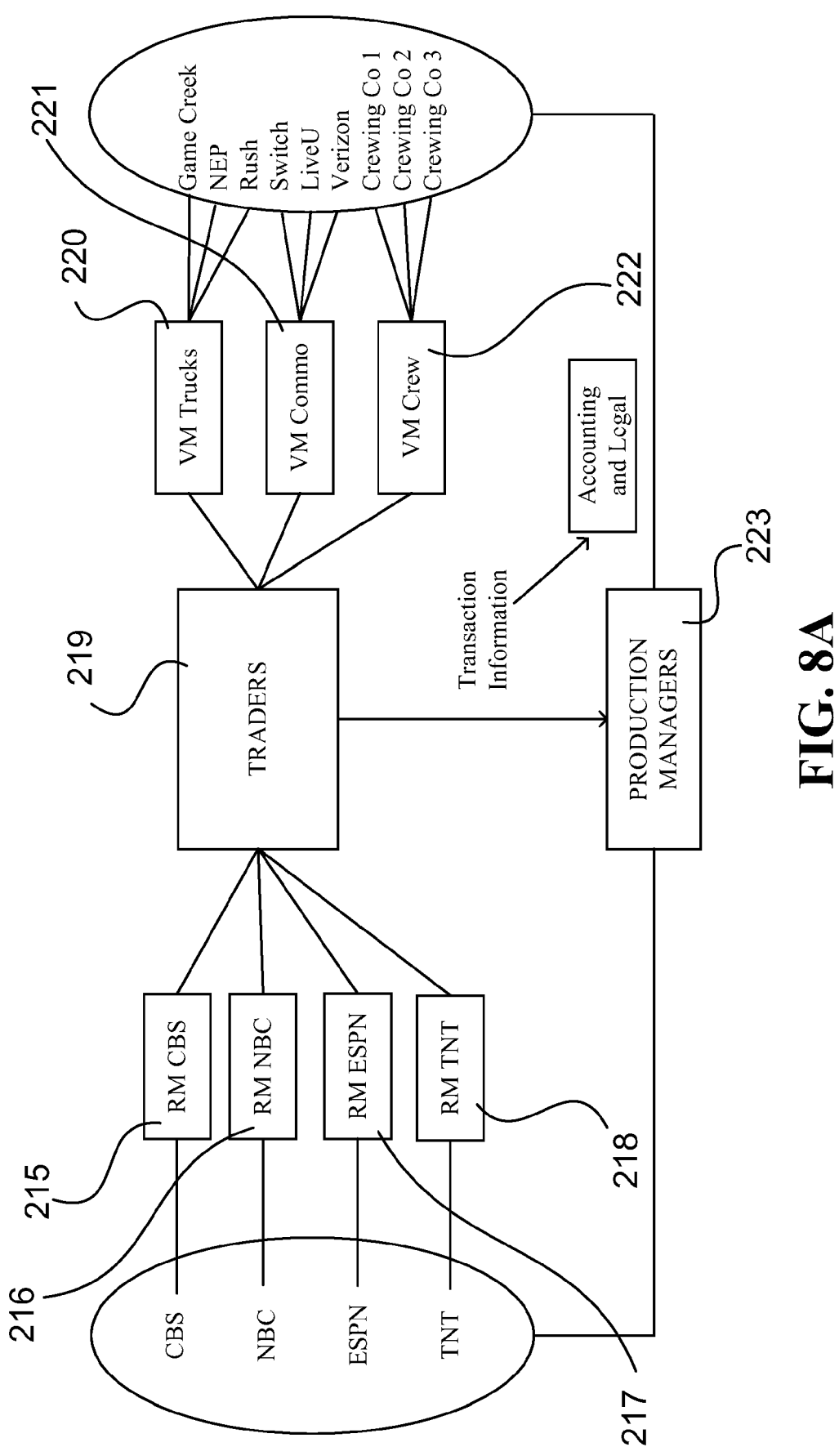
FIG. 8A illustrates an exemplary relationship diagram connecting Relationship Manager and Vendor Managers for the audio/video production system that improves efficiency, improves productivity and optimizes global video productions, media creation and broadcasting according to the present disclosure.

As shown in FIG. 8A, the RM/AE may act as an overall relationship management for a broadcast company such as CBS 215, NBC 216, ESPN 217, or TNT 218. Each RM may also act as single point of contact for each company to solicit orders, negotiate contracts, prepare requirements for a trader 219, and assure payments from the broadcast company. The trader 219 may be able to track available supply of assets, set prices, and commit the broadcast companies and vendors to contracts. The vendors may each have a VM 220, 221, 222 that act as purchasing agents for product/services and use transaction requirements to solicit bids. The VM's further negotiate contracts with the vendors, track and report excess supply for assets, and approve payments to vendors. Further, a productions manager 223, coordinates produces for programs, identifies mismatches, problems, and opportunities and verifies vendor performance.

The trading desk engine 110 may also have a vendor asset/resource query engine 224 adapted to search through asset/resources available through a specific vendor and a resource comparison engine 225 adapted to compare available resources to allow the end user to gather information about assets the user is considering using. Additionally, the trading desk engine 110 may also include a demand comparison engine 226 adapted to compare demand and usage of resources and assets and a trouble ticket engine 227 adapted to track issues and maintain a list of issues associated with assets used by users of the system 100. The pricing, priority and Risk engine 224, 228 may be adapted to allow all other engines to analyze and/or suggest the optimal in each category of price, priority and risk/rating. A supply & demand pricing engine 229 may be adapted to allow the trading desk engine 110 to suggest a rate for an asset based on the supply and demand of assets that are similar to the asset being offered. Additionally, the trading desk engine may be adapted to store data blindly related to each trade conducted through the system 230 and associate end user requests with an order history for that user 231. An offline resource trading desk 232 may be adapted to track information relating to assets that are not connected to the system 100 and facilitate trading of the unconnected assets. In addition, the offline resource trading desk may be adapted to communicate a cost to connect the unconnected asset and information regarding the cost of connect, such as a breakeven point for the asset after connecting the asset.

Figure 9:
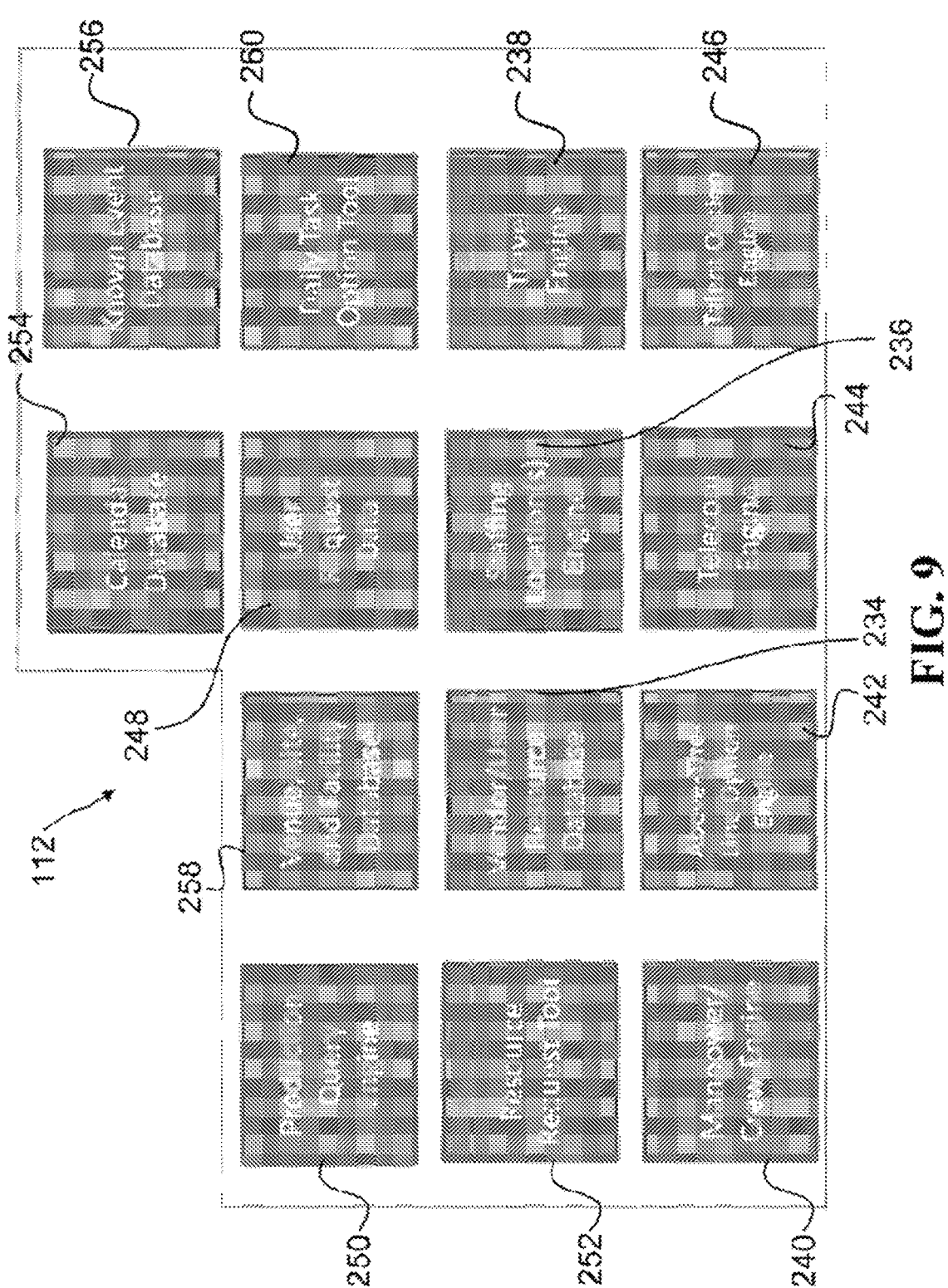
FIG. 9 illustrates a detailed block diagram for a scheduling engine for the audio/video production system that improves efficiency, increase productivity and optimizes global video productions, media creation and broadcasting according to the present disclosure.

The scheduling engine 112 may be communicably coupled to the input engine 104, the communication engine 108, the trading desk engine 110, the resources engine/database 114, the artificial intelligence engine 116, the commerce/cost engine 124, and/or the project plant generator 126. The scheduling engine 112 may be adapted to help schedule the selected assets to ensure the assets are available at the desired date and time. As shown in FIG. 9, the scheduling engine 112 may have a vendor/user resource database 234 with an engine for each category of assets available for example, staffing locations engine 236, travel engine 238, manpower/crew engine 240, above-the-line option engine 242, telecom engine 244, and talent option engine 246, to maintain information regarding the assets.

The schedule engine 112 may receive a resource request with user request data 248 including a location, and a date and time from a production query tool 250 with a resource request tool 252. The date and time of the resource request may be compared to a calendar database 254 with a known event database 256 adapted to store information regarding events that have occupied assets to determine which assets are available at the specified date and time and a venue, site, and facility database 258 adapted to store information about venues and sites where resources may be located. Further, the location of the resource request may be compared to a list of available locations stored in a venue, site, and facility database to see which assets are available at the specified location. The list of available assets at the specified location and the specified time may be used to determine which assets are available to be scheduled based on the user request data. A daily task option tool 260 may be adapted to inform of daily tasks needed to be performed by the end user or a third party to properly complete the project once assets are selected by the user. In particular, the daily task option tool 260 may offer the end user an independent service, a daily task service, and a concierge service. The independent service allows the end user to complete the job independently without assistance from the system once assets are selected. The daily task service provides the end user with a calendar of daily tasks that need to be completed to ensure the project is completed properly. The concierge service is adapted to complete all of the tasks for the end user to complete the project.

Figure 10:
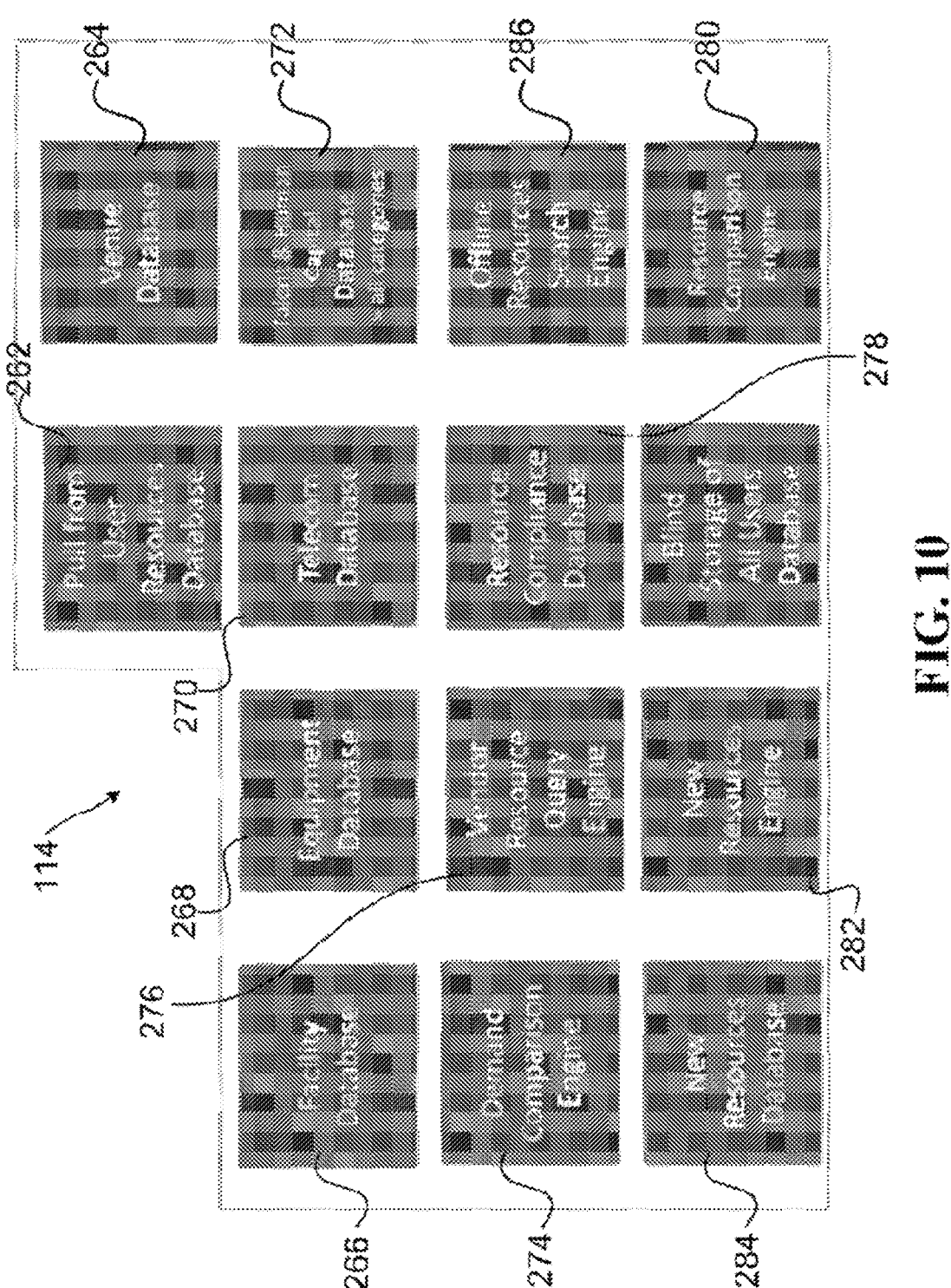
FIG. 10 illustrates a detailed block diagram for a resources/database engine for the audio/video production system that improves efficiency, increases productivity and optimizes global video productions, media creation and broadcasting according to the present disclosure.

The resources engine/database 114 may be in communication with the trading desk engine 110, the scheduling engine 112, and the cognitive engine 120 to allow the resources engine/database 114 to gather and store information about each of the categories of assets, users, and vendors. As shown in FIG. 9, the resources engine/database 114 may also be adapted to gather information 262 from the user resources database. As shown in FIG. 10, the resources engine/database 114 may have a venue database 264, a facility database 266, an equipment database 268, a telecom database 270, and a talent & human capital database 272 that each respectively stores information regarding which a category of resource offered through the system 100. Further, the resources engine 114 may have a demand comparison engine 274 adapted to gather and compare demand information for the resources offered through the system 100 and a vendor resource query engine 276 adapted to allow a user to ask a question about a specific resource that a specific vendor has offered through the system 100.

The resources engine/database 114 may also have a resource compliance database 278 adapted to store information about each resource which systems the resource can be used with and a resource comparison engine 280 adapted to compare stored information about resources to allow the user to make an informed decision on the best resource for the user. A new resource engine 282 and a new resource database 284 may be adapted to allow the resources engine/database 114 to gather and store information about new resources that can be used through the system 100. Further, an offline resources engine 286 may be adapted to search for and find additional offline resources. The offline resources engine 286 may also be adapted to maintain information about each of the offline resources, offer the resource through the system 100, and allow vendors and users to input an offline resource into the system 100.

Figure 10A:
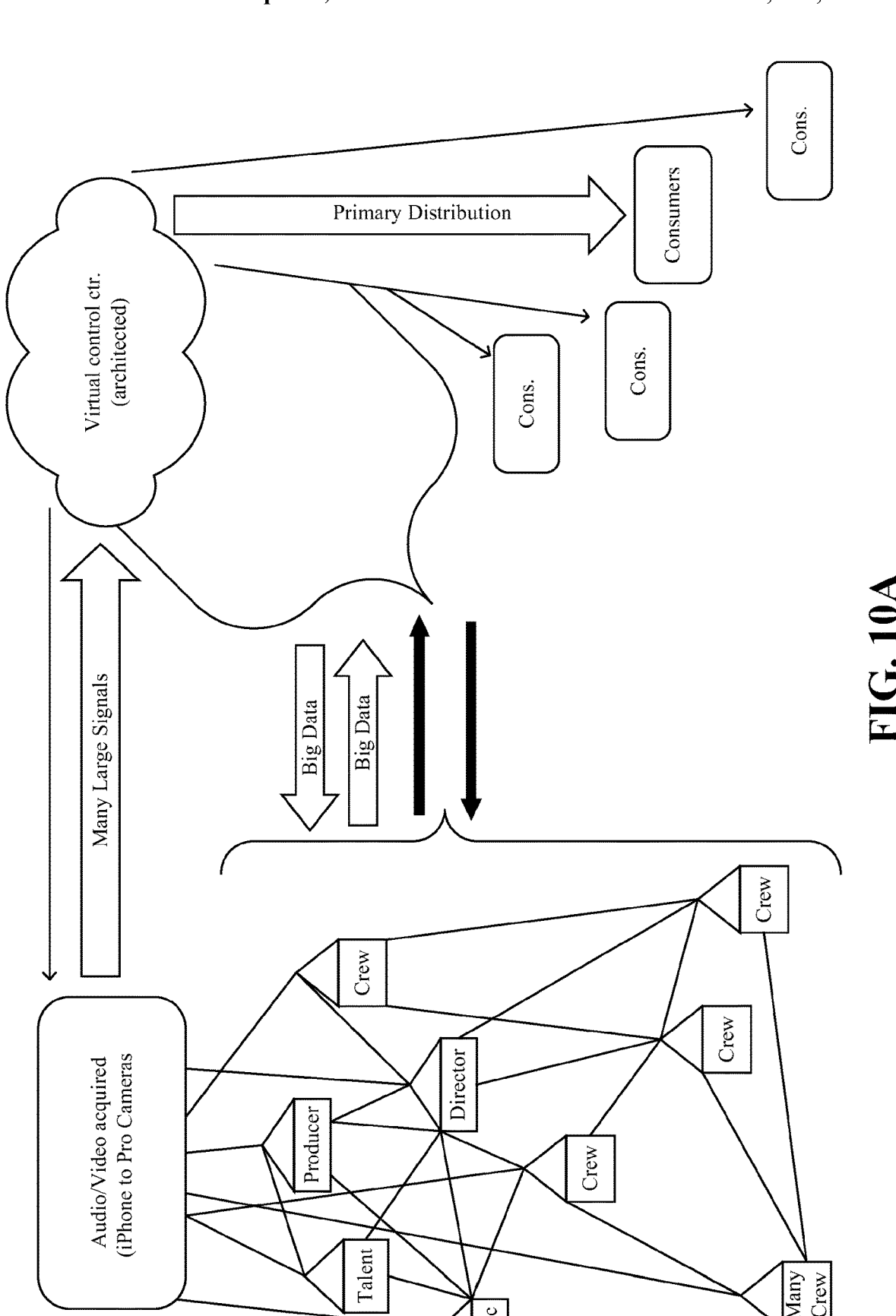
FIG. 10A illustrates an exemplary implementation of the trading desk engine and the resources/database engine for the audio/video production system that improves efficiency, increases productivity and optimizes global video productions, media creation and broadcasting according to the present disclosure.

FIG. 10A illustrates an exemplary overview implementation of the trading desk engine and the resources/database engine for the audio/video production system that improves efficiency and optimizes global video productions and broadcasting according to the present disclosure.

Figure 11:
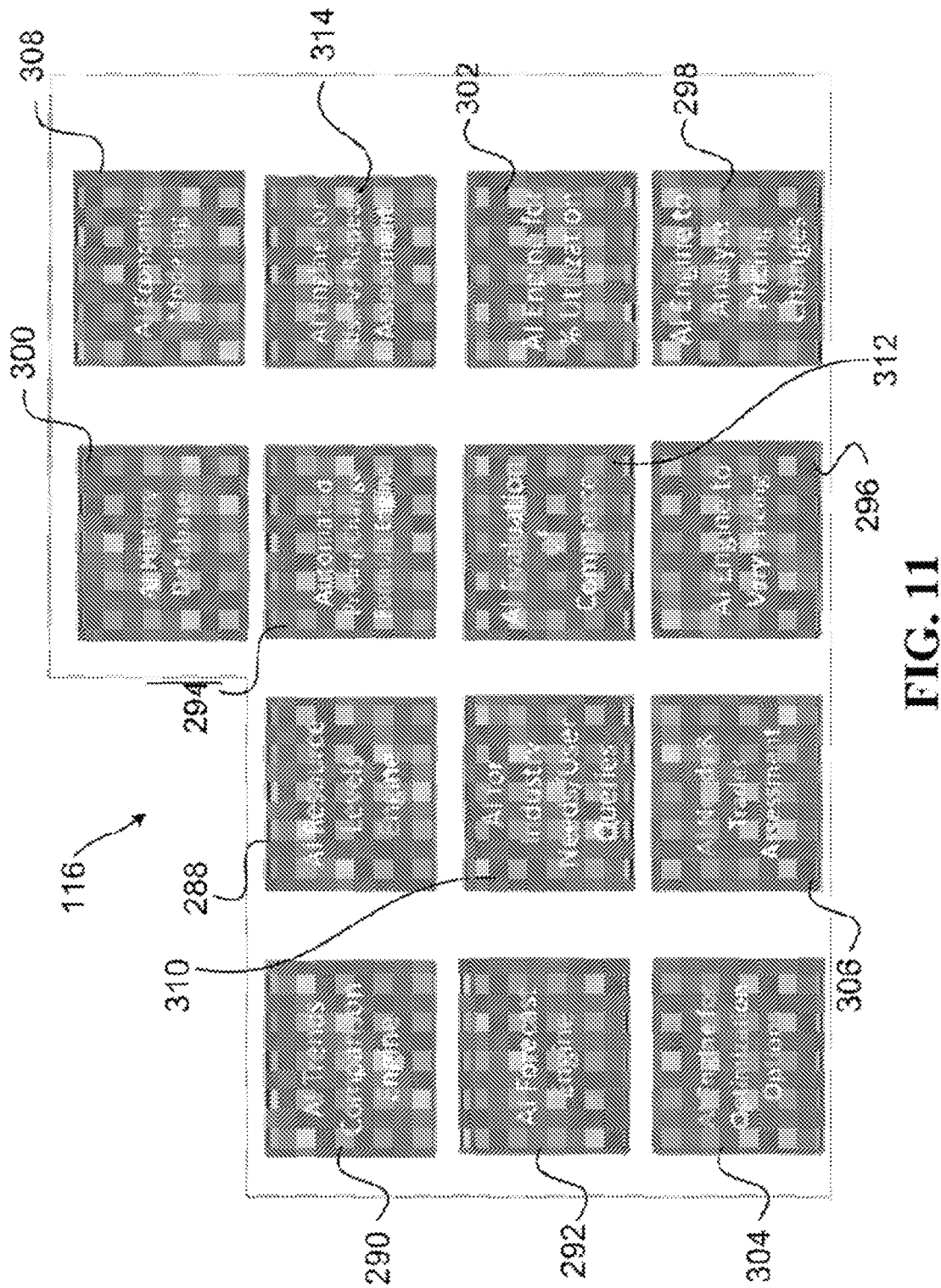
FIG. 11 illustrates a detailed block diagram for an artificial intelligence engine for the audio/video production system that improves efficiency, increases productivity and optimizes global video productions, media creation and broadcasting according to the present disclosure.

The artificial intelligence (AI) engine 116 may be communicably coupled to the communication engine 108, the trading desk engine 110, the scheduling engine 112, the compliance engine 118, the ratings/risk generator, the cost/commerce engine 124, and the project plan generator 126. The AI engine 116 may be adapted to determine and analyze information regarding the assets/resources. As shown in FIG. 11, the AI engine 116 may include an AI resource levels 288 engine adapted to automatically determine a level of a resource offered by a vendor within the resource's respective resource category, an AI trends comparison engine 290 adapted to determine trends in the resources, and an AI forecast engine 292 adapted to forecast future use of each of the resources based on current trends of the resources.

Further, the AI engine 116 may have an automated price change formula engine 294 adapted to determine when to adjust a price for resources based on predetermined conditions, an AI engine 296 adapted to automatically adjust the price based on the automated price change formula engine 294. The automated price change formula engine 294 may be adapted to change the price based on availability of resources. In particular, the automated price change formula engine 294 may be able to determine what happens to a price of the asset once vendors input a leftover amount of resources into the system 100. Pricing and demand changes may also be analyzed to balance the supply and demand. Further, the AI engine 296 may also be adapted to recognize a vendor with a special status that automatically adjusts the price of an asset from the recognized vendor to match a lower price on a similar asset if the lower price is reasonable. An AI engine 298 may be adapted to analyze how a price change has affected the utilization of a resource/asset. The AI engine 116 may also have an AI history database 300 that is a database of all AI activities within the system 100.

The AI engine 116 may also include an AI engine 302 adapted to determine a percentage of utilization for each resource offered through the system 100 based on the usage of the resources, and an AI engine 304 to optimize usage of each of the resource to realize an improved utilization of the resources. An AI Needs and Trades Assessment 306 may be adapted to help address asset needs for a known event with a known resource need and allow micro-trading between the assets. Further, the AI Needs and Trades Assessment 306 may also be adapted to gather information regarding lack of activity for resources. An AI Economic modeling 308 may be adapted to adjust the modeling of the system based on the priorities of the end user. For example, if the end user needs a project to be completed quickly, the system 100 may be adapted to offer more expensive resources to help meet the short deadline. Alternatively, the system may be adapted to offer resources that would be employed if the user chose higher or lower levels of quality, reliability/risk or other factors. The AI engine 116 may also have AI for industry needs/user queries 310 that is adapted to analyze needs for resources within the industry and the people/users/vendors that are asking for that need. An AI evaluation of commerce 312 may be adapted to make sure the system 100 and trades within the system are making money and that the trades make sense. An AI engine for risk vs. repeat assessment 314 may be adapted to determine whether a specific selection of assets has been previously selected. When the specific selection was previously selected, the AI engine for risk vs. repeat assessment 314 may determine there is very little risk. Additionally, the AI engine for risk vs. repeat assessment 314 may also present alternative option and the risk associated with those alternative option.

Figure 12:
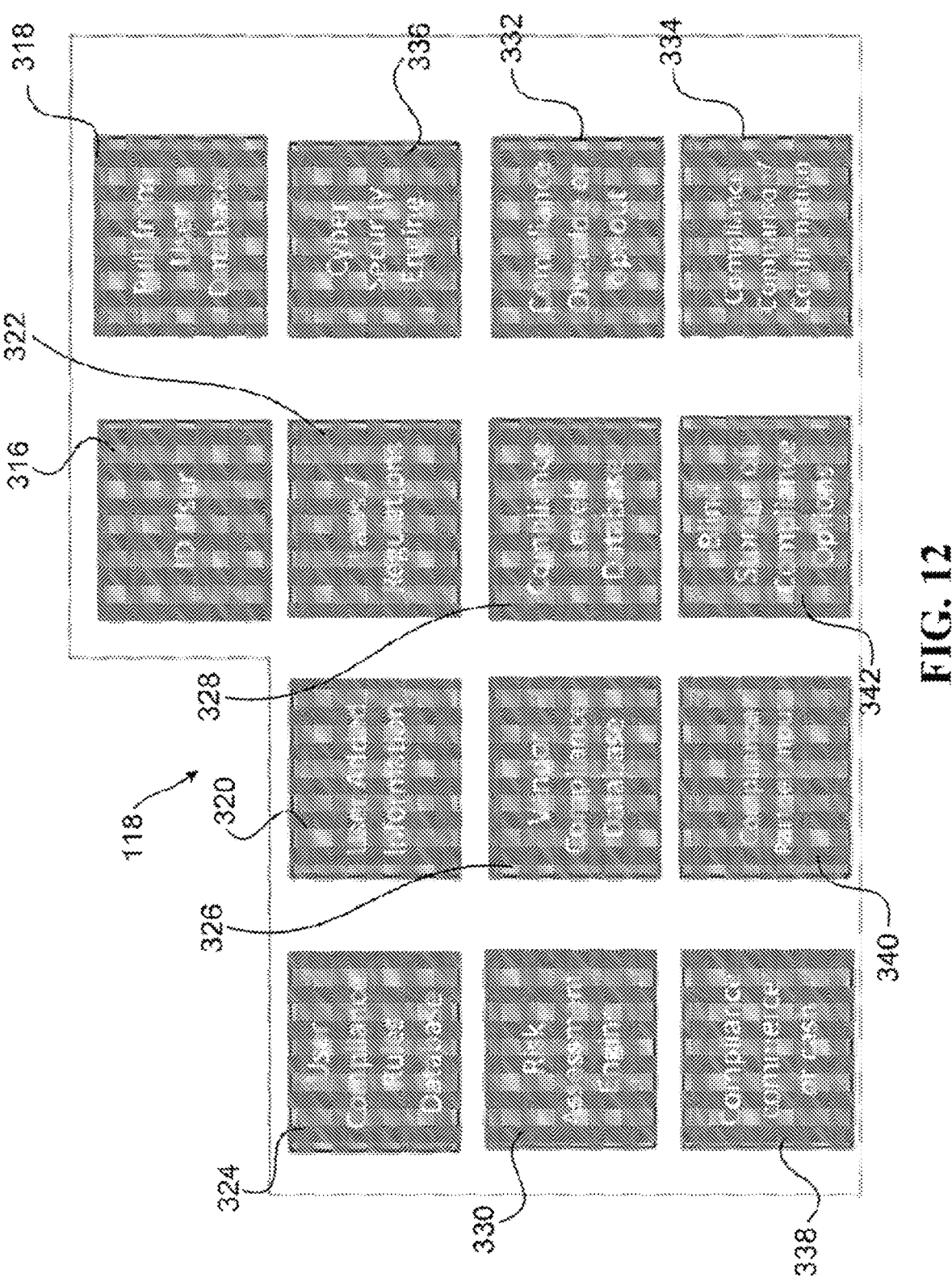
FIG. 12 illustrates a detailed block diagram for a compliance engine for the audio/video production system that improves efficiency, increases productivity and optimizes global video productions, media creation and broadcasting according to the present disclosure.

The compliance engine 118 may be communicably coupled to the trading desk engine 110 and the AI engine 116. The compliance engine 118, shown in more detail in FIG. 12, may be adapted to ensure the user's needs and government rules and regulation are met by the resources/assets. The compliance engine 118 may be adapted to identify an end user 316 using an entered account username or other identifying information, pull information 318 about the identified user from a user database such as stored user information, or user input information 320 from the input engine 104. It also includes information about government rules and regulations 322 associated with media production and broadcasting of an event. The compliance engine 118 may have a user compliance rules database 324 adapted to store rules for the user that the resources need to meet to address the user's needs, a vendor compliance database 326 adapted to store information about a vendor's compliance with stored rules and regulations, and a compliance levels database 328 adapted to store information related to the different levels of compliance with the stored rules and regulation information.

Further, a risk assessment engine 330 may be adapted to determine a chance the user, vendor, or resources do not comply with the stored rules and regulations information. The compliance engine 118 may also provide a user an override or opt out 332 of a requirement that a resource meets the stored user compliance rules if a user believes the resource would be a better fit for the user than other resources. It also includes a compliance confirmation 334 if all compliance rules are met or a comparison if the user overrides the compliance requirement. In addition, the compliance engine 118 may also have a specially configured cyber security engine 336 adapted to protect the sensitive information stored by the system 100 and prevent unauthorized users from entering and utilizing the system 100. The specially configured cyber security engine 336 may be adapted to authenticate a user of the connected device and the system 100 More specifically, the cyber security engine 336 is adapted to authenticate the user by sending an authentication code to the user, ask the user for the authentication code, include a watermark in documents that are exchanged, and secure any communication between the user and vendors. The compliance engine 188 may also be adapted to check the compliance of the resource, method, personnel, location, or the use of commerce or cash 338. In other words, the compliance engine is adapted ensure that the money or resource/asset from the user in exchange for the desired asset has sufficient value to match the value of the desired asset. A compliance partnership input 340 is adapted to determine whether the resources, partnership and assets input are available and are compliant. Further, the compliance options for each asset is blindly stored to protect the identity of the vendors associated with the asset 342.

Figure 13:
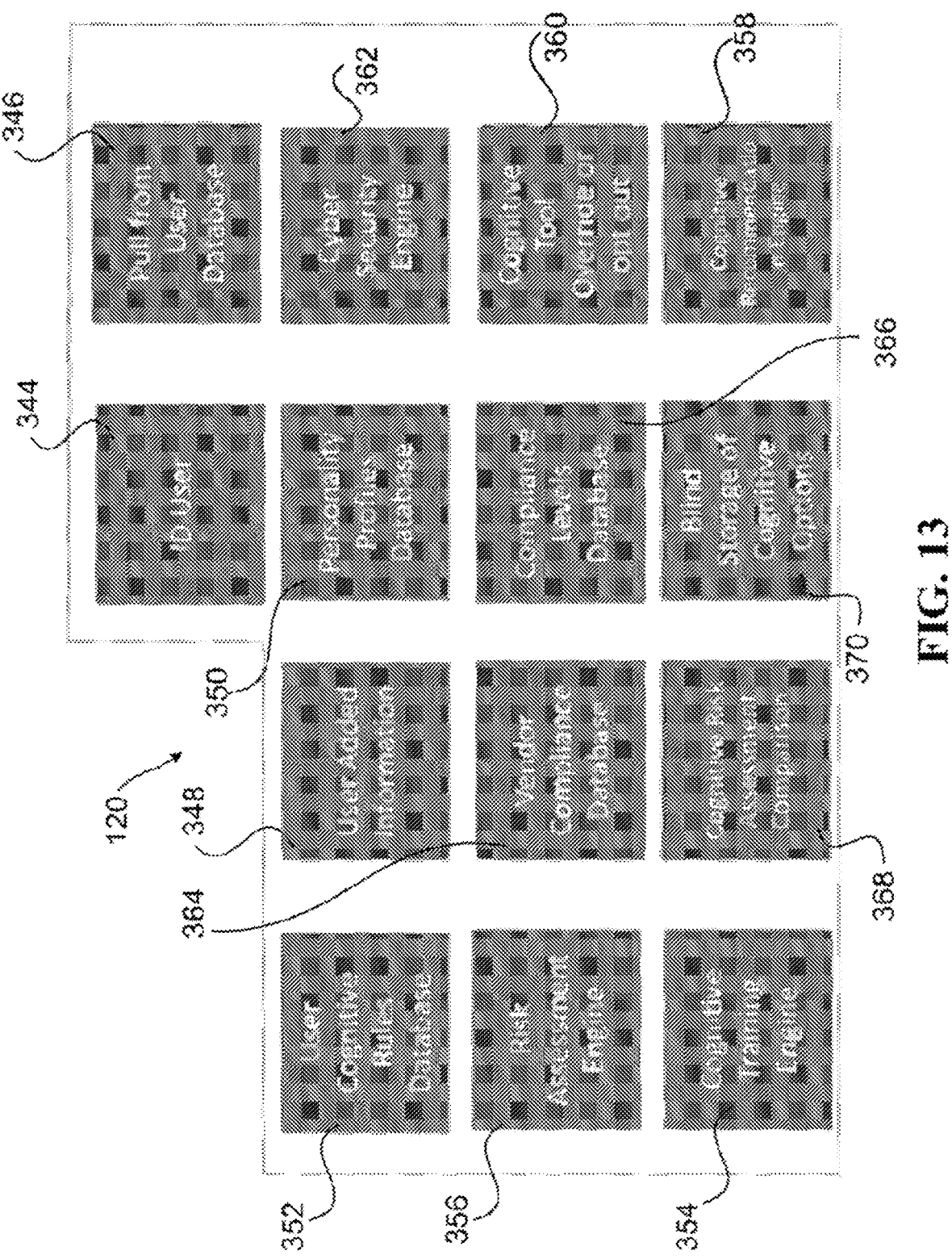
FIG. 13 illustrates a detailed block diagram for a cognitive engine for the audio/video production system that improves efficiency increases productivity and optimizes global video productions, media creation and broadcasting according to the present disclosure.

The architect engine 102 may also have the cognitive engine 120 communicably coupled to the category engine 106 and the resources database/engine 114. The cognitive engine 120, shown in more detail in FIG. 13, may be adapted to recognize specific traits associated with specific resources and recommend resources to the user based on desired trait information stored by the system 100. In particular, the cognitive engine 120 may be adapted to identify an end user 344 using an entered account username or other identifying information, pull information 346 about the identified user from a user database such as stored user information, or user input information 348 from the input engine 104, similar to the risk assessment engine 118 as described above. The cognitive engine 120 may also have a personality profile database 350 that stores information about users based on the users' activities while using the system, a user cognitive rules database 352 that is adapted to store cognitive rules about each user within the system 100, and a cognitive training engine 354 to allow the cognitive engine 120 adaptively learn more about the users based on their activities while using the system 100.

Further, the cognitive engine 120 may have a risk assessment engine 356 adapted to perform an assessment of the selected assets for use in the project and determine best assets for the project based on human behavior. More specifically, the risk assessment engine 356 may determine whether each asset is cognitively set up for one behavior compared to another using cognitive and behavioral assessment tools and, as desired, the probability the collection of assets for the project may or may not work based on human behavior. Further, when the risk assessment/probability exceeds a predetermined threshold, the risk assessment engine 356 may be adapted to prevent the selection of assets from being confirmed or can only be confirmed with sufficient warnings being acknowledged and/or approved by the user. A cognitive recommendation engine 358 also may be adapted to recommend resources/assets to the user based on the user's past usage of resources and experiences with the system 100.

The cognitive engine 120 may also allow a user to override or opt out of the cognitive recommendation 360 if a user believes the resource would be a better fit for the user than other resources. In addition, the compliance engine 118 may also have a specially configured cyber security engine 362 adapted to protect the sensitive information stored by the system 100 and prevent unauthorized users from entering and utilizing the system 100. A vendor compliance database 364 may be a database historical tracking what the vendors have done to be compliant for specific rules and regulation to help determine risk and a compliance levels database 366 may be adapted to determine the technical standards compliance of assets offered through the system 100. A cognitive risk assessment comparison 368 may be used to determine whether the personality of the asset fits the project description and desired direction of the project. Further, a blind storage of cognitive options 370 allows cognitive information to be stored privately and blindly to protect an identity of the asset/vendor/individual associated with the cognitive information.

Figure 14:
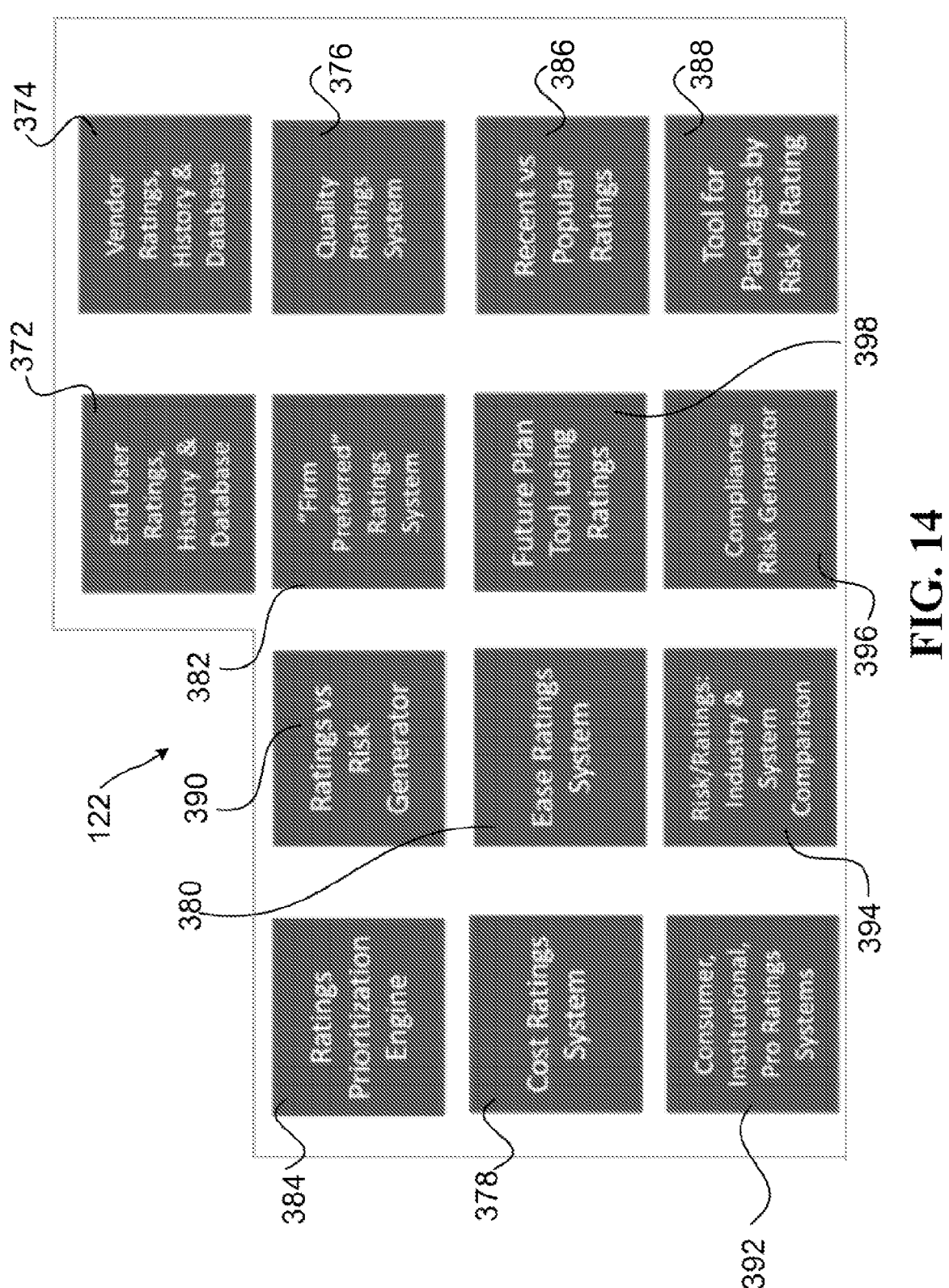
FIG. 14 illustrates a detailed block diagram for a ratings/risk generator for the audio/video production system that improves efficiency increases productivity and optimizes global video productions, media creation and broadcasting according to the present disclosure.

In order to enhance the users', individuals', and vendors' experience with the system, the architect engine 102 may further have the ratings/risk generator 122 that is adapted to receive and store ratings associated with each asset from the user and each user from the vendor of the asset. The ratings/risk generator 122 may be communicably coupled to the artificial intelligence engine 116 and the project plan generator 126. In particular, as shown in FIG. 14, the ratings generator 122 may have an end user ratings, history, and database 372 adapted to receive and store information about each end user based on vendors' experience with each end user after the end user uses one of the vendor's resources.

The ratings generator 122 may also have a vendor ratings, history, and database 374 adapted to receive and store review information about each of the vendors offering resources through the system 100 after an end user uses the resource. For example, the ratings generator 122 may have a quality ratings system 376 adapted to allow the end user to provide feedback to the system about the quality of the resource provided by the vendor. It may also include a cost ratings system 378 adapted to generate feedback about the costs associated with a utilized resource from a vendor, and an ease ratings system 380 adapted to generate feedback about the ease of use associated with a utilized resource from a vendor.

In addition, the ratings generator 122 may also have a firm preferred ratings system 382 adapted to provide additional recognition to highly rated assets and vendors and a ratings prioritization engine 384 adapted to determine which ratings are more accurately describe user and vendor experiences. The ratings generator 122 may be adapted to sort through the ratings of users/vendors and display ratings based on temporal proximity or popularity 386. The ratings generator 122 may further have a tool 388 adapted to determine packages of resources based on the rating associated with the resource for users. A ratings v. risk generator 390 may be adapted to determine a difference in a rating for an asset versus the risk associated with that asset. A consumer, institutional, pro ratings system 392 may be adapted to provide different ratings systems for different levels of commerce. For example, a consumer may have a different experience compared to an institution, such as a college, church, or the like. Further, the institution may have a different experience than professional users, such as a broadcasting company. As such, the consumer, institutional, pro ratings system 392 is used to reflect these different experiences. A risk/ratings: industry & system comparison 394 may be adapted to user information from the ratings v. risk generator 390 and the consumer, institutional, pro ratings system 392 to look at what each level did and the corresponding ratings. The ratings generator 122 may also have a compliance risk generator 396 adapted to adapt to different levels of risk in different countries and a future plan tool 398 adapted to determine and fulfill a need for more or specific resources in the future.

Figure 15:
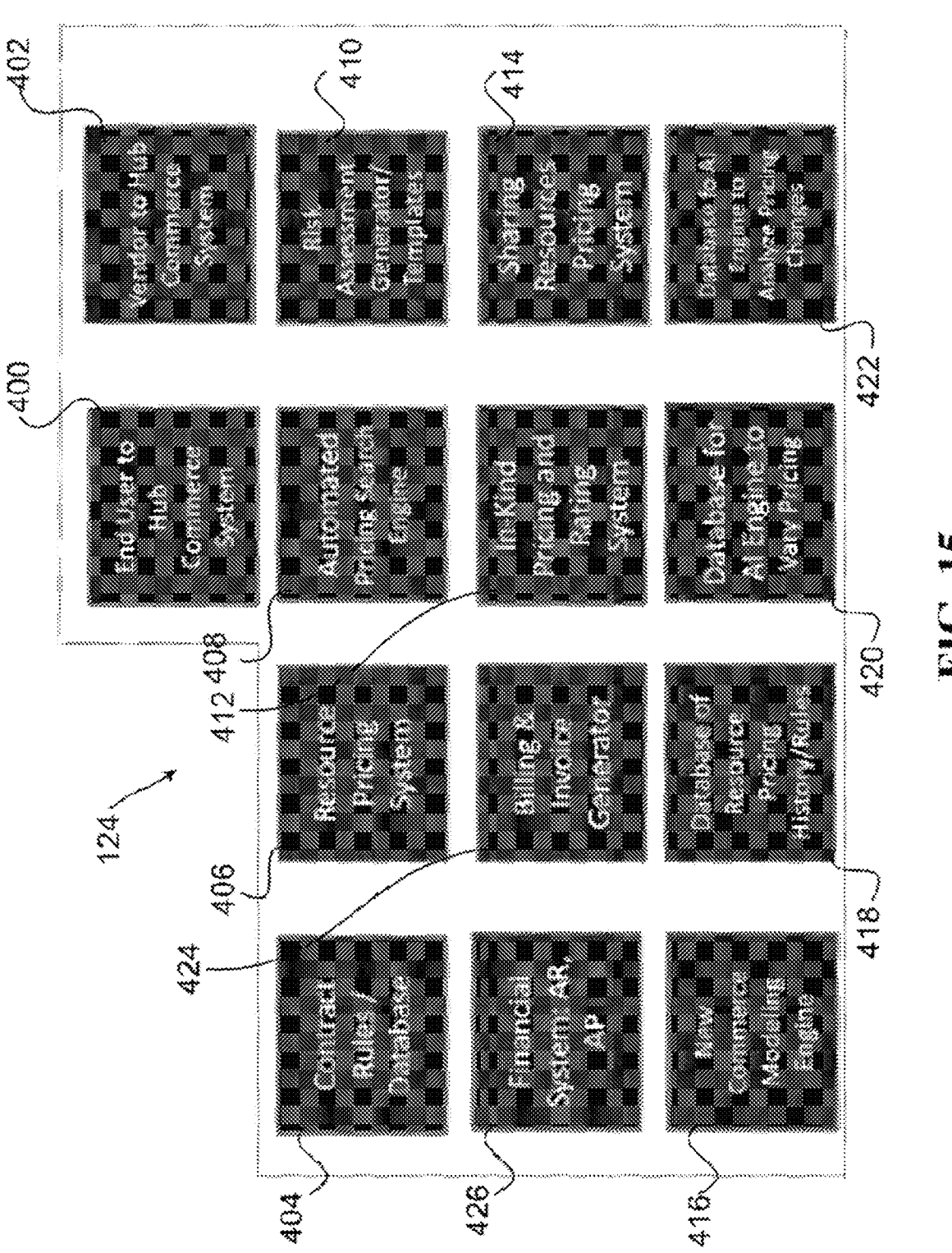
FIG. 15 illustrates a detailed block diagram for a cost/commerce engine for the audio/video production system that improves efficiency increases productivity and optimizes global video productions, media creation and broadcasting according to the present disclosure.

The commerce/cost engine 124 may be used to determine the cost associated with resources selected by the end user for use in the media production and broadcasting and form a relationship between the end user and vendor. The commerce/cost engine 124 may be communicably coupled to the communication engine 108, the scheduling engine 112, the AI engine 116, the project plan generator 126, and the booking engine 128. As shown in FIG. 15, the commerce/cost engine 124 may have a user to hub commerce system 400 and a vendor to hub commerce system 402 to facilitate the coordination and sharing of resources. The commerce/cost engine 124 may include a contract rules database 404 adapted to store rules and forms for contracts associated with the booking/use of assets by end users from vendors and a resource pricing system 406 adapted to determine a price for resources offered through the system 100. Further, the commerce/cost engine 124 may include an automated pricing search engine 408 adapted to automatically search for the lowest price within the system and determine where the current prices fall compared to those in the system and a risk assessment generator 410 adapted to determine why a current price came in low compared to other assets. More specifically, the risk assessment generator 410 may determine whether the asset is a good deal or whether there is high risk associated with the asset. The determination of the asset may be based on the template saying what is considered high risk and low risk.

The commerce/cost engine 124 may also have an in-kind pricing and rating system 412 adapted to determine resources that are similar in price and rating to a specified resource to offer alternative resources that might fit the end user's needs. The commerce/cost engine 124 may also be adapted to adjust a price of a resource based on a shared resource offered by end user that is determined using a sharing resources pricing system 414. In addition, the commerce/cost engine 124 may also be adapted to determine a price for a new resource offered through the system 100 using a new commerce modeling engine 416 and information from a database 418 that is adapted to store information related to resource pricing history and rules used to determine the pricing. The commerce/cost engine may have a database 420 for the AI engine 228 to adjust automatically the price, and a database 422 for the AI engine 230 adapted to analyze how a price change has affected the utilization of a resource/asset. Once a resource has been booked with the determined price, the commerce/cost engine is adapted to generate an invoice to send to the end user associated with costs for the resource with a billing and invoice generator 424 and track finances associated with the use of these resources using a financial system 426.

Figure 16:
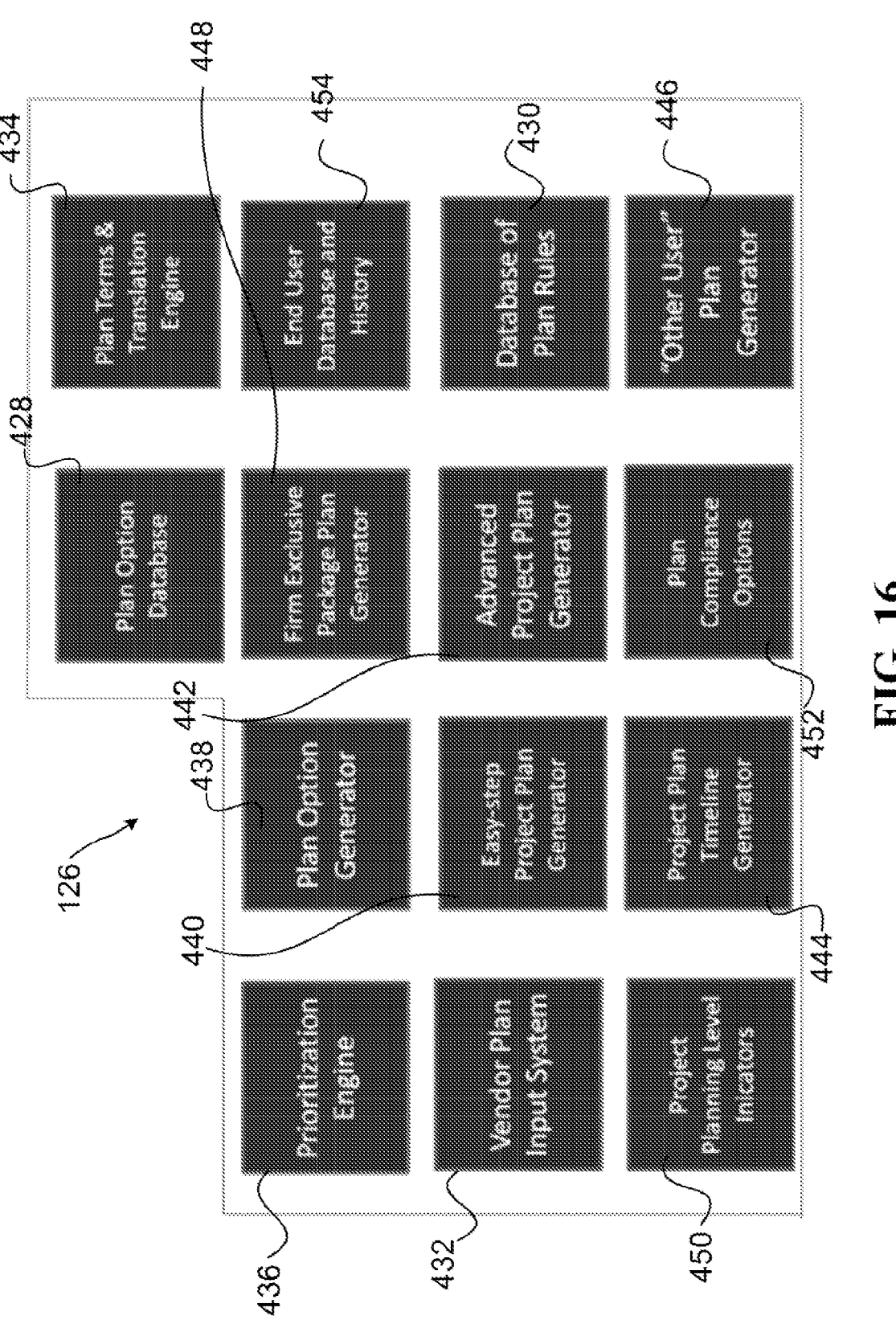
FIG. 16 illustrates a detailed block diagram for a project plan generator for the audio/video production system that improves efficiency increases productivity and optimizes global video productions, media creation and broadcasting according to the present disclosure.

The project plan generator 126 receives data from the scheduling engine 112 and the ratings/risk generator 122 and is communicably coupled to the commerce/cost engine 124 and the booking engine 128 to generate a coordinated plan for the different resources being provided by different vendors. As shown in FIG. 16, the project plan generator 126 may include a plan option database 428 that is adapted to store different plan options that may be useful for coordinating the resources and a database of plan rules 430 that stores rules that must be followed by any plan for the resources. The project plan generator 126 also includes a vendor plan input system 432 adapted to allow a vendor to input a plan associated with the resources. The project plan generator 126 may also have a plan terms and translation engine 434 adapted gather and translate information regarding the agreement for use of resources between the vendor and the end user, a prioritization engine 436 adapted to prioritize what matters most to the end user based on the matrix model, as described above. In particular, the project plan generator is adapted to present the priority to the user to confirm the desired priority, and a plan option generator 438 adapted to generate additional options for resources for the coordinated plan.

Further, the project plan generator 126 may include an easy-step project plan generator 440 adapted to generate an overview plan for the coordinated resources and an advanced project plan generator 442 adapted to generate a detailed plan to coordinate resources for the media production and broadcast. It may also include a project plan timeline generator 444 adapted to generate a timeline for the plan to coordinate resources. Additionally, the other user plan generator 316 may be adapted to gather information about other users and project plans generated by those users based on their priorities and present similar plans that may be used by the user to benefit the end user. A firm exclusive package plan generator 448 may be adapted to allow a user to select a project plan with exclusive option that are not otherwise available to user and project planning level indicators are adapted to present the level of the planned assets as part of the project plan. Plan compliance options 452 may be adapted to present options to a user to choose a compliant project plan or a more effective project plan. An end user database and history 454 may be adapted to collect and store information about the end user what they have historically done as a project plan. When the end user chooses or modifies a part of the project plan, the end user database and history 454 may request a confirmation from the end user that the change is wanted.

Figure 17:
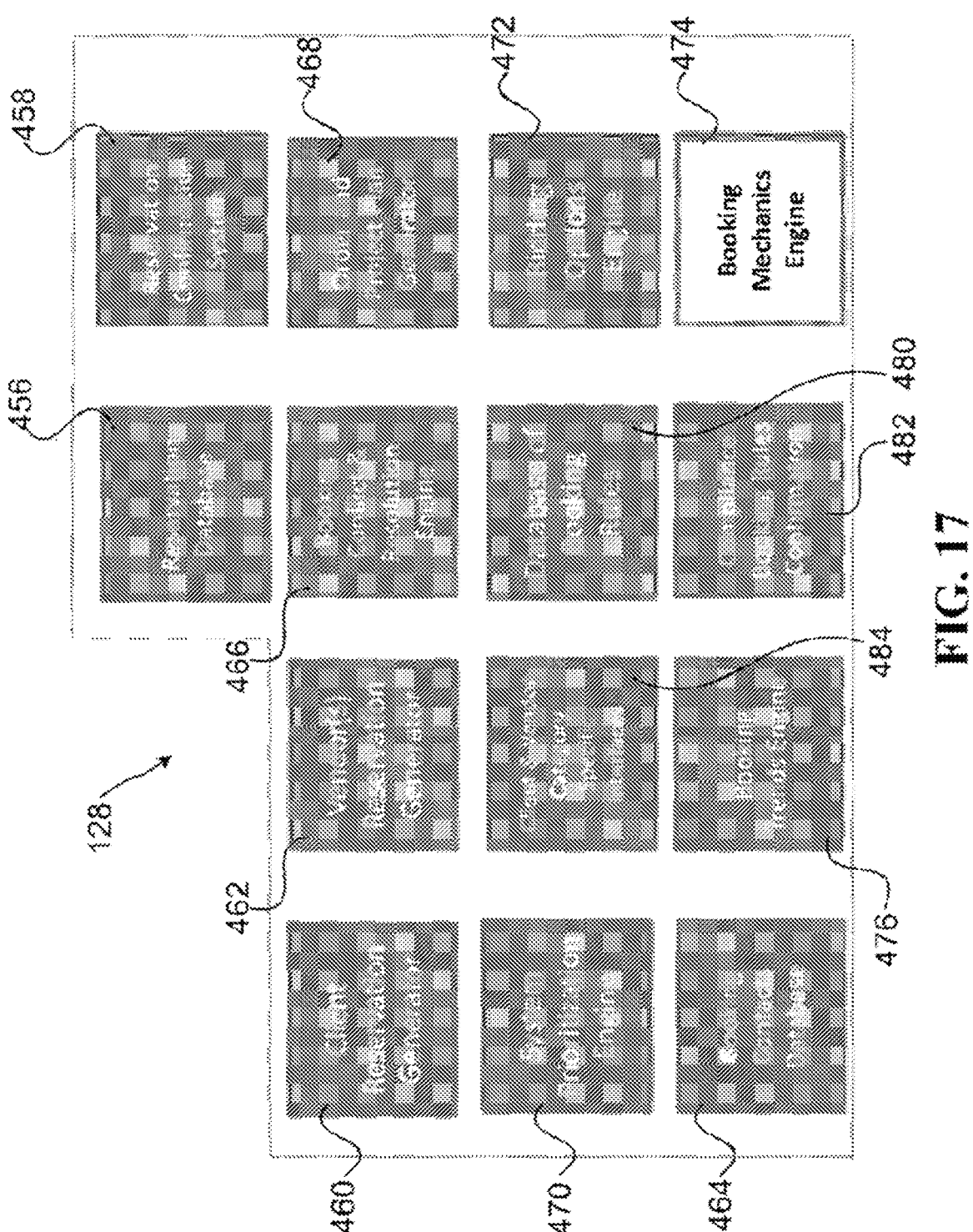
FIG. 17 illustrates a detailed block diagram for a booking engine for the audio/video production system that improves efficiency increases productivity and optimizes global video productions, media creation and broadcasting according to the present disclosure.

The booking engine 128 may be communicably coupled with the commerce/cost engine 124, the project plan generator 126, and the output generator 130. The booking engine 128, shown in more detail in FIG. 17, may include a reservation database 456 adapted to gather and store information about existing reservations for resources and assets and a reservation confirmation system 458 adapted to check the reservation database 456 for previous reservations of resources and assets to ensure the resources are available for the reservation time and confirm the reservation for the end user. Further, a user reservation generator 460 and a vendor reservation generator 462 may be used to generate reservations for each respective user and vendor to be stored in the reservation database 318 and a booking contacts database 464 may be adapted to store contact information for each user and vendor to book the resources for use.

In addition, the booking engine 128 may have a booking conflict & resolution engine 466 adapted to determine when there are overlapped reservations that create a conflict for the resources and help resolve the conflict and an order and project plan generator 468 and a system prioritization engine 470 may be used to provide an order of and plan for reservations for resources to address when multiple reservations for resources exist. A bidding option engine 472 may be adapted to provide various options for bidding for resources and assets and a booking mechanics engine 474 may be adapted to ensure standard scheduling procedures are followed for booking assets. For example, the booking mechanics engine 474 may be adapted to ensure a standard calendar is used by the user and end vendor for booking. Further, a booking trends engine 476 may be adapted to gather information about bookings of resources and determine any existing trades based on the gathered information. The booking engine 128 may have a database 478 of booking rules that need to be followed when resources are booked through the system 100 and a compliance booking rules confirmation 480 may be output when the rules are followed. Further, the client or vendor may have a specific way their system plugs into API, and the client or vendor may require client & vendor category specific interfaces 484 that are customized specific interfaces based on certain activities conducted, interface with categories specific to user/vendor need.

Figure 18:
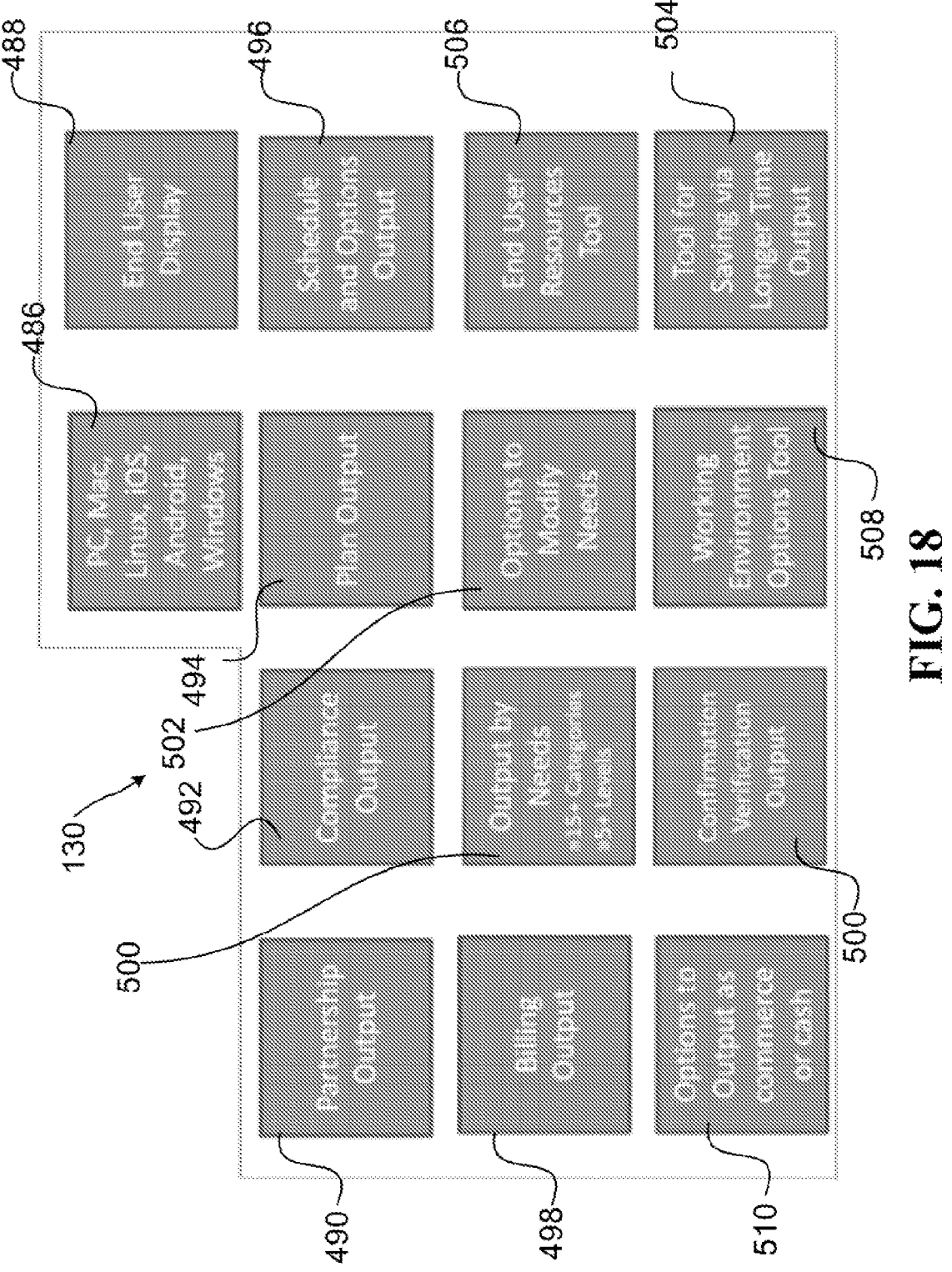
FIG. 18 illustrates a detailed block diagram for an output generator for the audio/video production system that improves efficiency increases productivity and optimizes global video productions, media creation and broadcasting according to the present disclosure.

The output engine 130 may be adapted to adapted output information related to the assets to the end user using the connected computing device 486 with an end user display 488. For example and as shown in FIG. 18, the output engine may be adapted to output information related to the booking of resources, such as, for example, a partnership output 490, a compliance output 492, a plan output 494 that includes information about an initial plan of the selected resources, a schedule and options output 496 that includes information about a timing to coordinate the selected resources, and a billing output 498 containing information about the cost to use the selected resources. Further, the output engine 130 may also output a confirmation verification output 500 adapted to verify the resources have been booked by the user. The output engine 130 may output the information based on needs 502 with an option to modify the needs 502 by the user. Further, the output engine 130 may have a tool for saving via longer time output 504 adapted to allow the end user to customize the project based on the user's priorities, an end user resources tool 506 adapted to allow the end user to input a resource the end user already has access to into the matrix model, and a working environment tool 508 adapted to allow the user to determine specific working environment for the project. For example, does the end user want to technologically advanced working environment, or diverse working environment, or the like. Further, the end user may also use commerce, such as resources, time, cyber currency, and the like, or cash as output in exchange for the selected assets.

According to the disclosure, users have access to an input graphical user interface (GUI), for example as shown in FIGS. 19-22, within an optimized network to address the user's media production and broadcasting needs for television broadcasts, radio broadcasts, and the like. The input GUI is accessible through a computing device within the network. The systems and methods disclosed herein provide improvements over present technical environments by using a system, for example system 100, for audio/video production system that improves efficiency and optimizes global video productions and broadcasting via the input interactive GUI. The intelligent personalization may be applied to various types of computing environments such as a computing device or mobile communication device, for example.

Figure 19:
FIG. 19 illustrates an exemplary embodiment of an input graphical user interface (GUI) for choosing a location for an audio/video production using the audio/video production system that improves efficiency increases productivity and optimizes global video productions, media creation and broadcasting according to the present disclosure.

As shown in FIG. 19, the GUI 600 may prompt a user to enter a location 602 of a particular event that the user requires assets/resource to produce and broadcast the event. The user may be able to enter the location of the event using a keyboard input, voice input, or the like. Further, the GUI 600 may show the location entered on a map 604 to confirm the location is correct.

Figure 20:
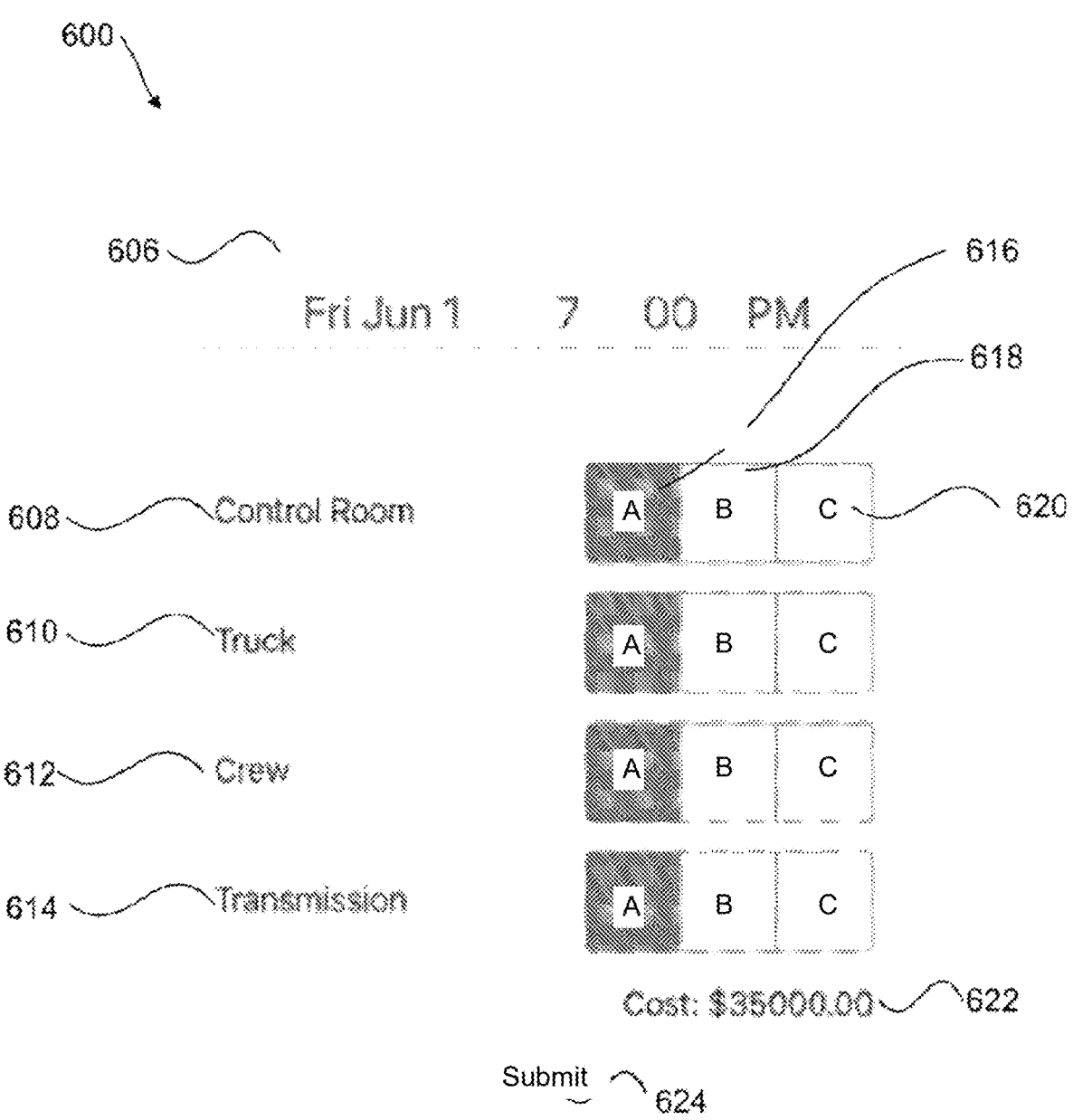
FIG. 20 illustrates a first exemplary embodiment of a scheduling interface connected to the input GUI of FIG. 18 according to the present disclosure.

Once the location has been confirmed, the user can input the desired date and time 606 for when resources are needed at the input location on the interactive GUI 400, as shown in FIG. 20. Further, the interactive GUI 600 may also be adapted to present resources from a plurality of categories of needed resources, such as a control room category 608, a truck category 610, a crew category 612, and a transmission category 614 in the context of the exemplary embodiment of media production and broadcasting.

Additionally, the interactive GUI 600 may be adapted to display and allow the end user to select a sublevel indicating different qualities and costs for each category of available resources. For example, the GUI 600 may display a high sublevel 616 that indicates a substantially high level of quality and consequently a higher cost, a middle sublevel 618 that indicates a substantially middle quality and cost, and a low sublevel 620 that indicates a lower level of quality with a lower cost. The GUI 600 is not limited to three sublevels and may be adapted to display as many sublevels as are available for each category for needed resources. According to the disclosure, the GUI 600 may also have a N/A sublevel 621 adapted to indicate that the end user does not need an asset from a specified category.

Figure 21:
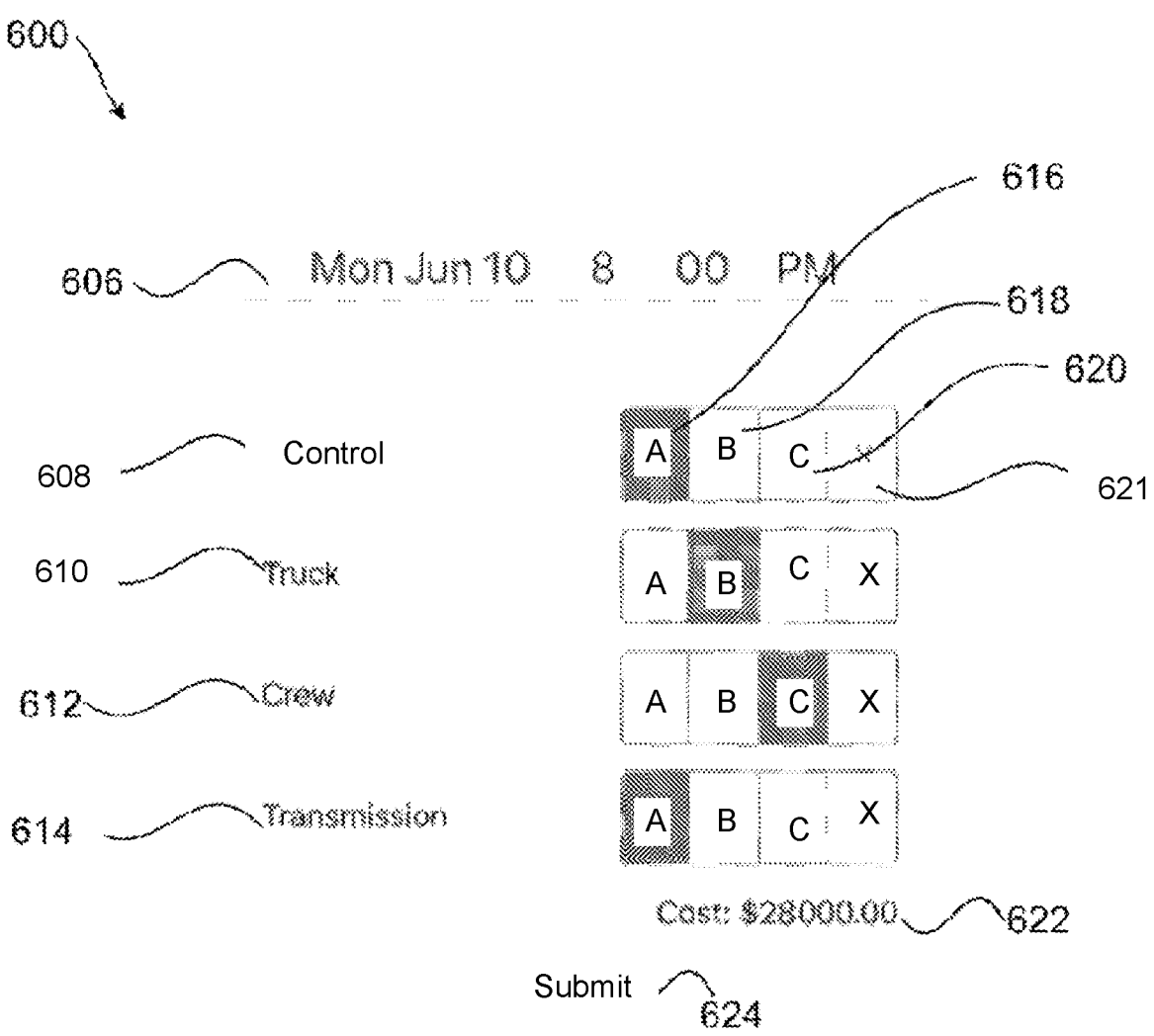
FIG. 21 illustrates a second exemplary embodiment of a scheduling interface connected to the input GUI of FIG. 18 according to the present disclosure.
Figure 22:
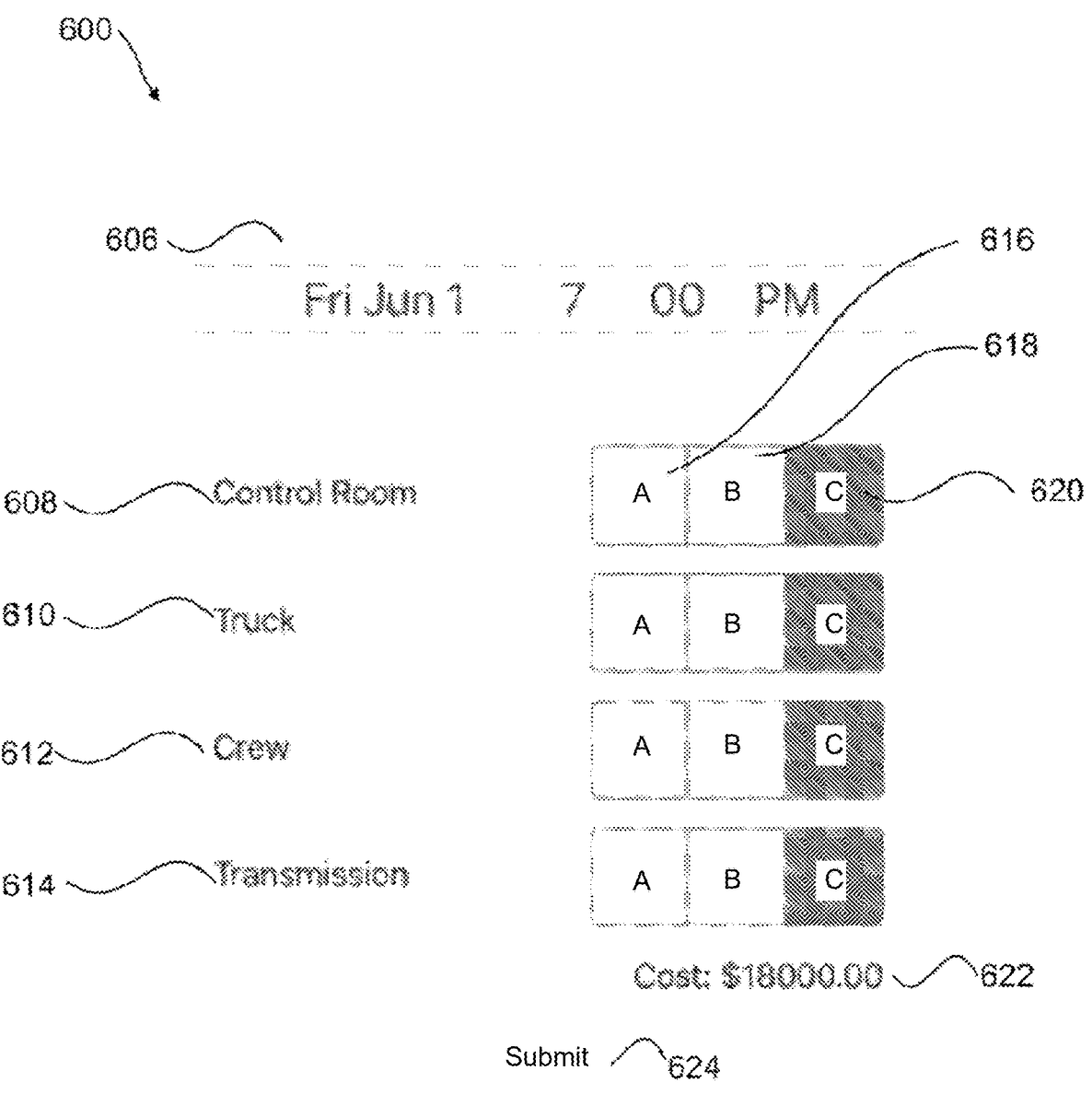
FIG. 22 illustrates a third exemplary embodiment of a scheduling interface connected to the input GUI of FIG. 18 according to the present disclosure.

The GUI 600 may also be adapted to display a cost 622 for the selected resources. The cost 622 may be adjusted based on changes to the different sublevels selected by the end user, as shown in FIGS. 21 and 22. Once the end user has selected the desired sublevels and a cost associated with the sublevels, the GUI 600 allows the end user to submit the resource selections using a submit button 624.

According to the present disclosure, the GUI 600 may also be adapted to allow the end user to input a budget amount related to a specific project. For example, the end user may input a budget of a specified amount of money. The system 100 may be adapted to output a selection of categories and levels of assets that can be used by the end user based on the budget input by the user.

FIG. 23 illustrates a flow diagram for a method 700 for an audio/video production system, for example system 100 that improves efficiency and optimizes global media productions and broadcasting according to the present disclosure. The method includes receiving a request for media production assets from a connected computing device of an end user at block 702. The request for media production assets may include a number of different categories of production assets that can be accessed by any connected user and connected vendor at any desired time from any remote location without the need to move resources to a physical location. Some examples of these categories of production assets may include site equipment assets, site crew assets, truck/hub equipment assets, truck/hub crew assets, telecommunications assets, above the line production assets, talent assets, administration assets, programming assets, and travel/new co-location assets. Further, the request may also include a desired remote location and a date and time for the production assets.

Further, the method 700 may include determining a plurality of available production assets for each of the categories of production assets at block 704. Each of the plurality of available production assets may also be separated into respective sublevels of the categories of production assets that are available to the end user. For example, a category of production resources may include a high-quality sublevel, a middle quality sublevel, and a low quality sublevel. The method 500 may also include receiving a selection of production assets from the categories of production assets from the connected computing device at block 706. A cost associated with the production asset may be displayed on the computing device. Further, the selection of production assets may include a selection of the sublevels of the categories of production assets. The selection of different sublevels may affect the cost of the production assets displayed on the computing device and the cost displayed may be adjusted based on the selection of different sublevels of the categories of production assets. The system may also request and receive user production assets that can be offered through the system to allow other users access to the user production assets.

The method 700 may also include reserving the selected production assets for use by the end user based on the request at block 708. The reservation of the selected production assets may be for the desired remote location and data and time specified by the end user and other users may be prevented from requesting any one of the selected assets during the specified date and time. Further, the method 700 may also include establishing a remote control connection between the end user and the selected production assets at block 710. The remote control connection allows the end user to utilize each of the selected production assets to the user's liking to produce and broadcast an event. At block 712, the control connection is terminated when end user's request is completed and the event has ended.

Although aspects of the present disclosure are described with respect to embodiments in an audio/visual production and broadcast context, it should be understood that various disclosed techniques can be used in numerous other fields in which management of resources can be coordinated to optimize their utilization. The present disclosure can also be readily applied to other different sharing economies and digital economies. For example, the architect engine 102 and the corresponding engines within the architect engine 102 can be used to coordinate assets for use in other contexts such as construction and manufacturing contexts. Further, the matrix model may further be used to prioritize specific traits for transportation navigation and ride-sharing. Accordingly, the present disclosure is not limited to a specific context and be applied in numerous contexts, such as those described above, in addition to other contexts as well. Various applications of the disclosed techniques provide substantial improvements to the functioning of the computer apparatus and the technical environments in which the various applications are implemented.

The improved systems and devices implementing an interactive graphical user interface for an information processing system that improves the end's experience in multiple areas and increasing resource utilization: enabling proactive steps to address the customer's needs, providing more resources for end users to address their own needs while decreasing costs. The end user experience is enhanced by an experience more efficiently and simply address the end user's needs for additional resources.

Aspects of the present disclosure contain elements and/or combination of elements that coordinate information from a variety of sources into a specially configured, networked system with an architecture for end user architects in the video, television and media industry to efficiently utilize media production and broadcasting resources.

Aspects of the present disclosure improve the particular technical environment of a specially configured, networked system with an architecture for end user architects in the video, television and media industry to efficiently utilize media production and broadcasting resources. Aspects of the present disclosure improve the operation of certain resource utilization, machines, networks and/or systems by generating a structured form of information including options for otherwise unavailable resources, thereby improving the efficiency of resource utilization, and reducing costs and wasted resources.

In various embodiments, software may be stored in a computer program product and/or loaded into a special purpose computer system using removable storage drive, hard disk drive or communications interface. Aspects of the disclosed process may be implemented in control logic or computer program instructions, which when executed causes the special purpose computer system to perform the functions of various embodiments as described herein. Implementation of system including special purpose machines to perform the functions described herein will be apparent to persons skilled in the relevant art(s).

The systems, machines and processes described herein may be used in association with web services, utility computing, pervasive and individualized computing, security and identity systems and methods, autonomic computing, cloud computing, commodity computing, mobility and wireless systems and methods, open source, biometrics, grid computing, artificial intelligence, machine learning, and/or mesh computing.

Databases discussed herein are generally implemented on special purpose machines, systems and/or networks to ensure privacy of confidential health information and data security is preserved in accordance with industry standards and government regulations. The databases may include relational, hierarchical, graphical, or object-oriented structure and/or other database configurations. Moreover, the databases may be organized in various manners, for example, as data tables or lookup tables. In addition to the inventive techniques for combining health information with social media information disclosed herein, association of certain data may be accomplished through various data association technique such as those known or practiced in the art. One skilled in the art will also appreciate that databases, systems, devices, servers or other components of the disclosed systems or machines may consist of any combination thereof at a single location or at multiple locations, wherein each database, system or machine may include of suitable security features, such as firewalls, access codes, encryption, decryption, compression, decompression, and/or the like. The special purpose systems, networks and/or computers discussed herein may provide a suitable website or other Internet-based graphical user interface which is accessible by users.

Functional blocks of the block diagrams and flowchart illustrations support combinations of means for performing the specified functions, combinations of steps for performing the specified functions, and program instruction means for performing the specified functions. It should be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Moreover, although the present disclosure has been described herein with reference to the accompanying drawings, it is to be understood that the present disclosure is not limited to those precise teachings, and that various other changes and modifications may be made by one skilled in the art without departing from the spirit and scope of the present disclosure.

What is claimed is:

1. A method for providing resources to a user device via a time-limited production architecture, the method comprising:

receiving, from the user device, a request for resources associated with a type of project;

identifying a set of resources based on receiving the request, each resource of the set of resources associated with one or more respective devices remotely located from the user device, each resource associated with a respective time frame of availability;

prioritizing the set of resources in accordance with user selection of one or more priority criteria from a set of priority criteria, the set of priority criteria including the respective time frame of availability of each production resource, a respective quality metric of each resource of the set of resources, a respective price of each resource of the set of resources, and the type of project, the respective quality metric of each resource being based, at least in part, on user feedback;

transmitting, to the user device, a first message indicating the prioritized set of resources and the respective time frame of availability of each resource;

receiving, from the user device, a second message indicating a two or more resources from the prioritized set of resources in accordance with transmitting the first message, the two or more resources having been selected by a user associated with the user device in response to transmitting the first message; and establishing the time-limited production architecture between the user device and each device of the one or more respective devices associated with each resource of the two or more resources based on receiving the second message from the user device.

2. The method of claim 1, wherein:

the type of project is a content creation project; and the time-limited production architecture is established to enable the user to interactively develop and/or produce content on the subset of resources.

3. The method of claim 2, wherein each one of the set of resources provides one or more services, to a user associated with the user device, for interactively developing and/or producing content.

4. The method of claim 3, wherein the second message further indicates the respective price and the respective quality metric associated with each resource of the prioritized set of resources.

5. The method of claim 1, wherein:

the request further indicates a budget range; and the respective price of each resource of the set of resources or a total price of the set of resources is within the budget range.

6. The method of claim 1, wherein the one or more resources include one or more of cloud based resources or local device resources.

7. The method of claim 1, further comprising:
determining, via a machine learning model, a respective
use trend for one or more resources of the set of
resources; and
estimating the respective time frame of availability of the
one or more resources of the set of resources based on
determining the respective use trend for the one or
more resources of the set of resources.

8. The method of claim 1, wherein the set of resources
include one or more of a personnel resource, talent resource,
a production staff, an operator, a transport device, a distri-
bution device, an audio/video capture device, an audio/video
editing device, or a premises device.

9. The method of claim 8, wherein the one or more
resources are production resources.

10. An apparatus for providing resources to a user device
via a time-limited production architecture, comprising:
one or more processors; and
memory coupled with the one or more processors and
storing processor-executable code that, when executed
by the one or more processors, is configured to cause
the apparatus to:
receive, from the user device, a request for resources
associated with a type of project;
identify a set of resources based on receiving the
request, each resource of the set of resources asso-
ciated with one or more respective devices remotely
located from the user device, each resource associ-
ated with a respective time frame of availability;
prioritize the set of resources in accordance with user
selection of one or more priority criteria from a set
of priority criteria, the set of priority criteria includ-
ing the respective time frame of availability of each
production resource, a respective quality metric of
each resource of the set of resources, a respective
price of each resource of the set of resources, and the
type of project, the respective quality metric of each
resource being based, at least in part, on user feed-
back;
transmit, to the user device, a first message indicating
the prioritized set of resources and the respective
time frame of availability of each resource;
receive, from the user device, a second message indi-
cating a two or more resources from the prioritized
set of resources in accordance with transmitting the
first message, the two or more resources having been
selected by a user associated with the user device in
response to transmitting the first message; and
establish the time-limited production architecture
between the user device and each device of the one
or more respective devices associated with each
resource of the two or more resources based on
receiving the second message from the user device.

11. The apparatus of claim 10, wherein:
the type of project is a content creation project; and
the time-limited production architecture is established to
enable the user to interactively develop and/or produce
content on the subset of resources.

12. The apparatus of claim 11, wherein each one of the set
of resources provides one or more services, to a user
associated with the user device, for interactively developing
and/or producing content.

13. The apparatus of claim 12, wherein the second mes-
sage further indicates the respective price and the respective
quality associated with each resource of the prioritized set of
resources.

14. The apparatus of claim 10, wherein:
the request further indicates a respective budget range for
each resource of the set of resources or a total budget
range; and
the respective price of each resource of the set of
resources corresponds to the respective budget range of
each resource of the set of resources or a total price of
the set of resources is within the total budget range.

15. The apparatus of claim 10, wherein the one or more
resources include one or more of cloud based resources or
local device resources.

16. The apparatus of claim 10, further comprising:
determining, via a machine learning model, a respective
use trend for one or more resources of the set of
resources; and
estimating the respective time frame of availability of the
one or more resources of the set of resources based on
determining the respective use trend for the one or
more resources of the set of resources.

17. The apparatus of claim 10, wherein the set of
resources include one or more of a personnel resource, talent
resource, a production staff, an operator, a transport device,
a distribution device, an audio/video capture device, an
audio/video editing device, or a premises device.

18. The apparatus of claim 17, wherein the one or more
resources are production resources.

19. A non-transitory computer-readable medium having
program code recorded thereon for providing resources to a
user device via a time-limited production architecture, the
program code executed by one or more processors and
comprising:
program code to receive, from the user device, a request
for resources associated with a type of project;
program code to identify a set of resources based on
receiving the request, each resource of the set of
resources associated with one or more respective
devices remotely located from the user device, each
resource associated with a respective time frame of
availability;
program code to prioritize the set of resources in accor-
dance with user selection of one or more priority
criteria from a set of priority criteria, the set of priority
criteria including the respective time frame of avail-
ability of each production resource, a respective quality
metric of each resource of the set of resources, a
respective price of each resource of the set of resources,
and the type of project, the respective quality metric of
each resource being based, at least in part, on user
feedback;
program code to transmit, to the user device, a first
message indicating the prioritized set of resources and
the respective time frame of availability of each
resource;
program code to receive, from the user device, a second
message indicating a two or more resources from the
prioritized set of resources in accordance with trans-
mitting the first message, the two or more resources
having been selected by a user associated with the user
device in response to transmitting the first message; and
program code to establish the time-limited production
architecture between the user device and each device of
the one or more respective devices associated with each
resource of the two or more resources based on receiv-
ing the second message from the user device.

20. The non-transitory computer-readable medium of claim 19, wherein:

the type of project is a content creation project; and the time-limited production architecture is established to enable the user to interactively develop and/or produce content on the subset of resources.

* * * * *